US012374827B2

(12) United States Patent
Marsh et al.

(10) Patent No.: US 12,374,827 B2
(45) Date of Patent: Jul. 29, 2025

(54) ELECTRICAL CONNECTOR HAVING A LATCHING SLIDER

(71) Applicant: TE Connectivity Solutions GmbH, Schaffhausen (CH)

(72) Inventors: John Marsh, Swindon (GB); Vinayakumar Shettar, Middletown, PA (US); Ramesh S, Bangalore (IN)

(73) Assignees: TE Connectivity Solutions Gmbh, Schaffhausen (CH); Tyco Electronics UK Ltd, Swindon (GB)

( * ) Notice: Subject to any disclaimer, the term of this patent is extended or adjusted under 35 U.S.C. 154(b) by 397 days.

(21) Appl. No.: 17/895,278

(22) Filed: Aug. 25, 2022

(65) Prior Publication Data

US 2023/0335947 A1 Oct. 19, 2023

Related U.S. Application Data

(60) Provisional application No. 63/332,506, filed on Apr. 19, 2022.

(51) Int. Cl.
*H01R 13/631* (2006.01)
*H01R 12/70* (2011.01)

(52) U.S. Cl.
CPC ....... *H01R 13/631* (2013.01); *H01R 12/7005* (2013.01)

(58) Field of Classification Search
CPC ........ H01R 13/62905; H01R 13/62911; H01R 13/62916; H01R 13/62922; H01R 13/62927
See application file for complete search history.

(56) References Cited

U.S. PATENT DOCUMENTS

| | | | | |
|---|---|---|---|---|
| 4,361,374 A * | 11/1982 | Marmillion | H01R 13/625 | 439/314 |
| 4,586,771 A * | 5/1986 | Kraemer | H01R 12/724 | 439/157 |
| 5,964,603 A * | 10/1999 | Hanazaki | H01R 13/62905 | 439/157 |
| 6,193,530 B1 * | 2/2001 | Sakurai | H01R 13/62905 | 439/153 |
| 2016/0087374 A1 * | 3/2016 | Kim | H01R 13/62927 | 439/310 |

* cited by examiner

*Primary Examiner* — Oscar C Jimenez

(57) ABSTRACT

An electrical connector includes a housing having walls forming a cavity that receives a mating electrical connector. The walls include a base wall, side walls, and end walls. The base wall includes contact channels. The first side wall includes a slider slot open to the cavity. The electrical connector includes contacts held in the contact channels. The electrical connector includes a slider received in the slider slot and movable in a sliding direction within the slider slot. The slider includes a slider post extending into the cavity and movable within the cavity as the slider moves in the sliding direction. The slider post is configured to be received in a guide track of the mating electrical connector to locate the mating electrical connector within the cavity of the housing.

20 Claims, 17 Drawing Sheets

ELECTRICAL CONNECTOR HAVING A LATCHING SLIDER

CROSS REFERENCE TO RELATED APPLICATIONS

This application claims benefit to U.S. Provisional Application No. 63/332,506, filed 19 Apr. 2022, titled "ELECTRICAL CONNECTOR HAVING A LATCHING SLIDER", the subject matter of which is herein incorporated by reference in its entirety.

BACKGROUND

The subject matter herein relates generally to electrical connectors.

Electrical connectors are used to electrically connect various components within a communication system. The electrical connectors are typically mated at a separable mating interface. Some connectors include a large number of contacts that are mated together during mating. The mating forces between the contacts are cumulative, leading to high mating forces between the connectors when a large number of contacts are provided. Some known connectors include mating assist devices to provide mechanical assistance during mating of the connectors. However, the mating assist devices are bulky and occupy space that could otherwise be used for other components.

A need remains for a mating assist device for an electrical connector having a low profile.

BRIEF DESCRIPTION

In one embodiment, an electrical connector is provided and includes a housing having walls forming a cavity configured to receive a mating electrical connector. The walls include a base wall, a first side wall, a second side wall, a first end wall, and a second end wall. The base wall is provided at a rear of the housing. The base wall includes contact channels. The first side wall includes a slider slot open to the cavity. The electrical connector includes contacts held in the contact channels. The contacts have mating ends configured to be mated with the mating electrical connector. The electrical connector includes a slider received in the slider slot and movable in a sliding direction within the slider slot. The slider includes a slider post extending into the cavity and movable within the cavity as the slider moves in the sliding direction. The slider post is configured to be received in a guide track of the mating electrical connector to locate the mating electrical connector within the cavity of the housing.

In another embodiment, a connector system is provided and includes a plug connector including a plug housing holding plug contacts. The plug housing has a plug end. The plug housing includes a guide track at the plug end. The electrical connector includes a header connector including a header housing holding header contacts. The header housing has walls forming a cavity that receives the plug end of the plug housing. The walls include a base wall, a first side wall, a second side wall, a first end wall, and a second end wall. The base wall provided at a rear of the housing. The base wall including contact channels. The first side wall includes a slider slot open to the cavity. The header contacts are held in the contact channels. The header contacts have mating ends mated with the plug contacts when the plug connector is plugged into the cavity. The header connector includes a slider received in the slider slot and movable in a sliding direction within the slider slot. The slider includes a slider post extending into the cavity and movable within the cavity as the slider moves in the sliding direction. The slider post is received in a guide track of the plug housing to locate the plug end of the plug housing within the cavity of the header housing.

In a further embodiment, a connector system is provided and includes a plug connector including a plug housing holding plug contacts. The plug connector includes cables terminated to the plug contacts. The plug housing has a plug end and a cable end opposite the plug end. The plug housing includes a guide track at the plug end. The plug connector includes a cable cover coupled to the cable end. The cable cover includes a first cable exit and a second cable exit extending in different directions. The electrical connector includes a header connector including a header housing holding header contacts. The header housing has walls forming a cavity that receives the plug end of the plug housing. The walls include a base wall, a first side wall, a second side wall, a first end wall, and a second end wall. The base wall provided at a rear of the housing. The base wall including contact channels. The first side wall includes a slider slot open to the cavity. The header contacts are held in the contact channels. The header contacts have mating ends mated with the plug contacts when the plug connector is plugged into the cavity. The header connector includes a slider received in the slider slot and movable in a sliding direction within the slider slot. The slider includes a slider post extending into the cavity and movable within the cavity as the slider moves in the sliding direction. The slider post is received in a guide track of the plug housing to locate the plug end of the plug housing within the cavity of the header housing.

DETAILED DESCRIPTION

Figure 1:
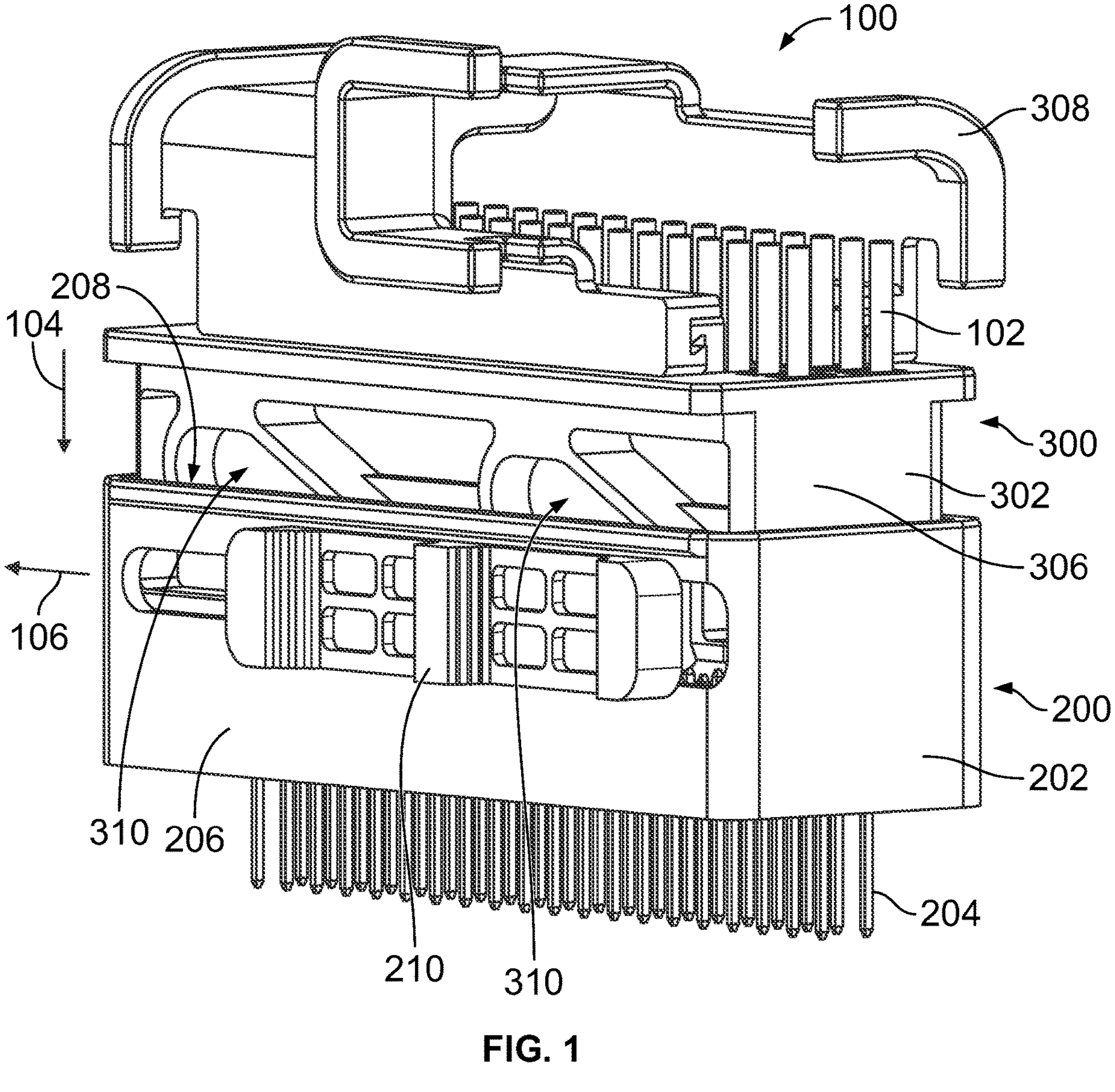
FIG. 1 is a perspective view of a communication system in accordance with an exemplary embodiment.
Figure 2:
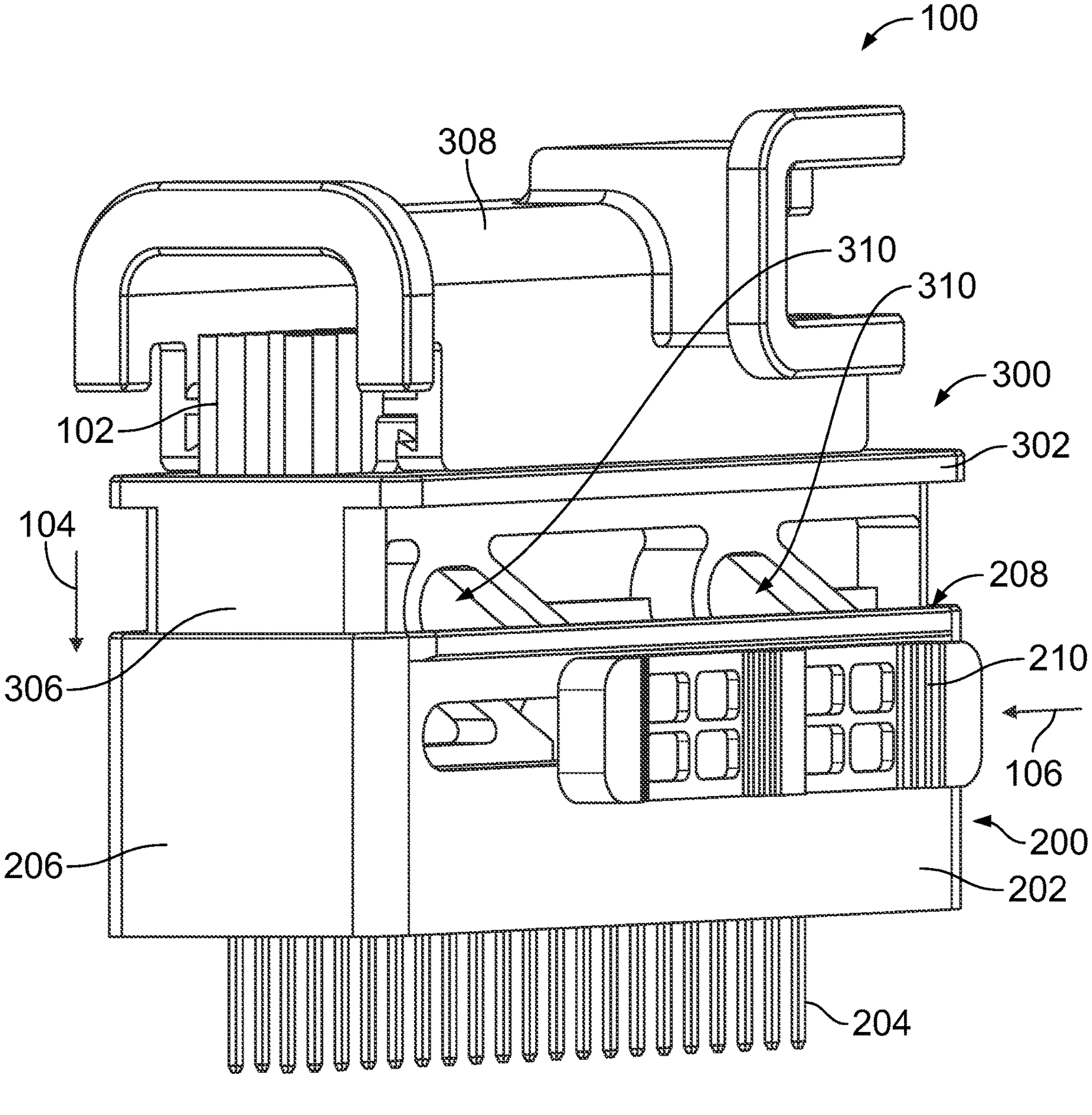
FIG. 2 is another perspective view of the communication system taken from an opposite end.
Figure 3:
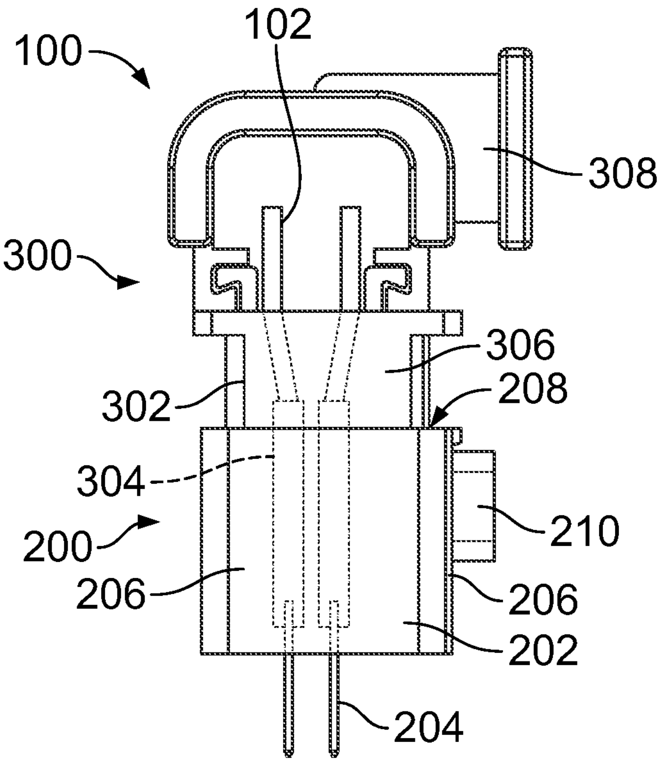
FIG. 3 is an end view of the communication system in accordance with an exemplary embodiment.
Figure 4:
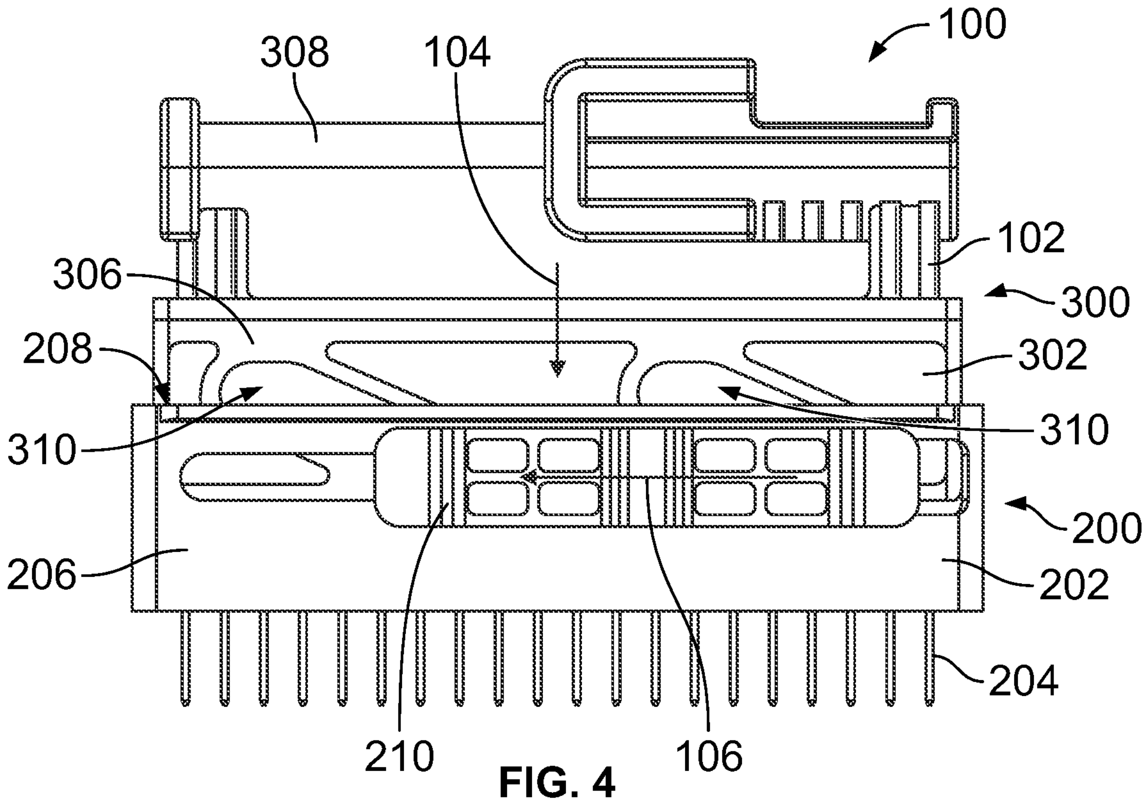
FIG. 4 is a side view of the communication system in accordance with an exemplary embodiment.

FIG. 1 is a perspective view of a communication system 100 in accordance with an exemplary embodiment. FIG. 2 is another perspective view of the communication system 100 taken from an opposite end. FIG. 3 is an end view of the communication system 100 in accordance with an exemplary embodiment. FIG. 4 is a side view of the communication system 100 in accordance with an exemplary embodiment.

The communication system 100 includes a first electrical connector 200 and a second electrical connector 300 mated with the first electrical connector 200. In an exemplary embodiment, the second electrical connector 300 is configured to be plugged into the first electrical connector 200. In such embodiments, the second electrical connector 300 defines a plug connector and may be referred to hereinafter as a plug connector 300. The first electrical connector 200 receives the plug connector and thus defines a receptacle connector or header connector and may be referred to hereinafter as a receptacle connector 200 or a header connector 200.

In an exemplary embodiment, the header connector 200 is a board connector configured to be mounted to and electrically connected to a circuit board (not shown). For example, the header connector 200 may be press-fit or soldered to the circuit board. However, in alternative embodiments, the header connector 200 may be a cable connector provided at an end of one or more cables. In the illustrated embodiment, the plug connector 300 is a cable connector provided at ends of cables 102. The plug connector 300 and the header connector 200 are used to electrically connect the cables 102 with the circuit board. However, in alternative embodiments, the plug connector 300 may be a board connector configured to be mounted to a circuit board.

FIGS. 1 and 2 illustrate the plug connector 300 partially mated with the header connector 200. For example, the plug connector 300 is shown initially loaded into the header connector 200. In an exemplary embodiment, the communication system 100 includes a mating assist device to assist in mating the plug connector 300 with the header connector 200. In the illustrated embodiment, the mating assist device includes a slider that may be actuated in a linear sliding direction that is perpendicular to the mating direction. The sliding action of the slider is transferred to mating movement between the plug connector 300 and the header connector 200.

The header connector 200 includes a header housing 202 holding a plurality of header contacts 204. The header housing 202 includes a plurality of walls 206 forming a cavity 208. The header contacts 204 extend into the cavity 208 for mating with the plug connector 300. An end of the plug connector 300 is loaded into the cavity 208 in a mating direction 104. In an exemplary embodiment, the header connector 200 includes a slider 210 that is slidably coupled to one of the walls 206 of the header housing 202. The slider 210 is configured to interface with the plug connector 300 during mating. In an exemplary embodiment, the slider 210 is thin and has a low profile. Optionally, the slider 210 is located close to the side of the header housing 202 freeing up space around the header housing 202 for other components. In an exemplary embodiment, the slider 210 is movable in a linear sliding direction 106 between a retracted position and an advanced position to assist mating of the plug connector 300 with the header connector 200 in the mating direction 104. In an exemplary embodiment, the sliding direction 106 is generally perpendicular to the mating direction 104.

The plug connector 300 includes a plug housing 302 holding a plurality plug contacts 304 (shown in phantom in FIG. 3). The plug housing 302 includes a plurality of walls 306 forming an exterior of the plug connector 300. The walls 306 define a plug housing footprint along the outer perimeter of the plug housing 302. In an exemplary embodiment, the plug housing footprint is contained within (no larger than) a header housing footprint of the header housing 202. As such, the plug housing 302 does not add to the overall size of the communication system 100. In an exemplary embodiment, the plug connector 300 includes a cable cover 308 coupled to an end of the plug housing 302. The cable cover 308 is used to guide routing of the cables 102 to one or more cable exits at one or more sides of the cable cover 308. In an exemplary embodiment, the plug housing 302 includes one or more guide tracks 310 along the exterior of one or more of the walls 306. The guide track 310 receive portions of the slider 210 to guide mating between the plug connector 300 and the header connector 200. The slider 210 is movable within the guide tracks 310 to assist with mating of the plug connector 300 with the header connector 200.

Figure 5:
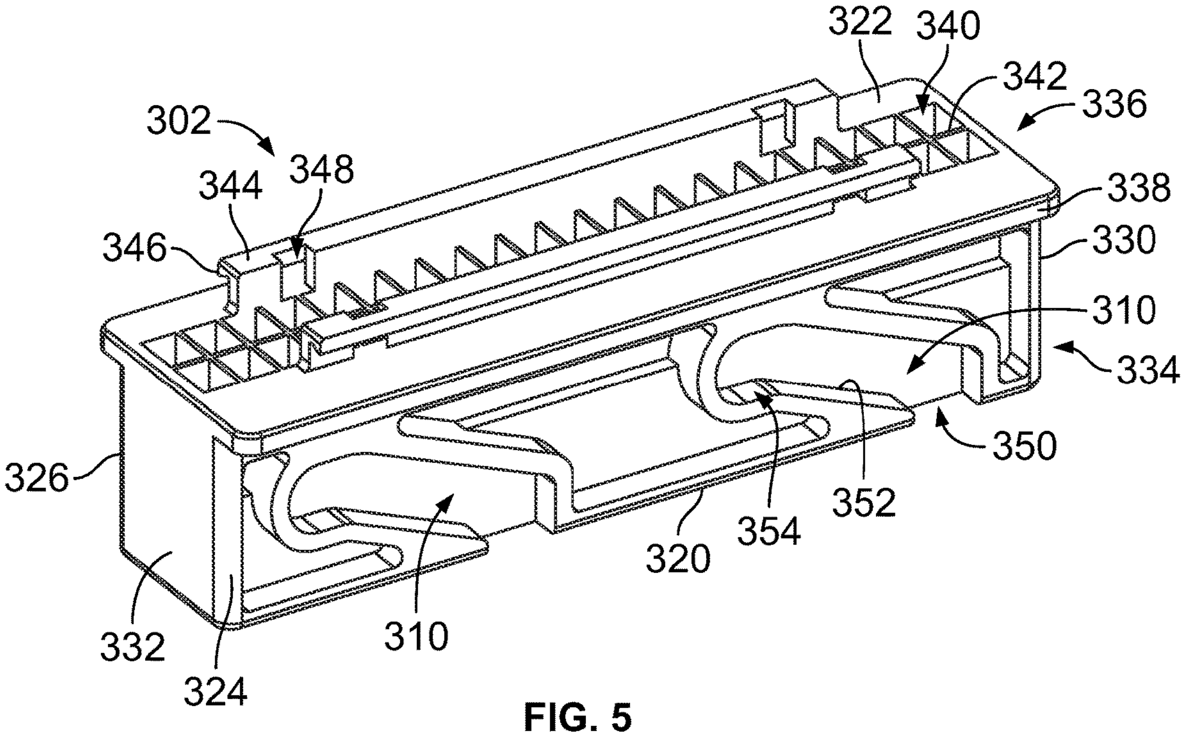
FIG. 5 is a perspective view of the plug housing in accordance with an exemplary embodiment.

FIG. 5 is a perspective view of the plug housing 302 in accordance with an exemplary embodiment. In an exemplary embodiment, the plug housing 302 is manufactured from a dielectric material, such as a plastic material. The plug housing 302 may be a molded plastic part. For example, the plug housing 302 may be manufactured by an injection molding process.

The plug housing 302 extends between a front 320 and a rear 322. The plug housing 302 includes a first side wall 324 and a second side wall 326 opposite the first side wall 324.

The side walls 324, 326 extend between the front 320 and the rear 322. The plug housing 302 includes a first end wall 330 and a second end wall 332 opposite the first end wall 330. The end walls 330, 332 extend between the front 320 and the rear 322 and extend between the first side wall 324 and the second side wall 326. In the illustrated embodiment, the plug housing 302 is generally rectangular or box shaped. However, the plug housing 302 may have other shapes in alternative embodiments. In an exemplary embodiment, the plug housing includes a plug end 334 at the front 320 and a cable end 336 at the rear 322. The plug end 334 is configured to be plugged into the cavity 208 of the receptacle connector 200 (shown in FIG. 1). The plug end 334 extends along the side walls 324, 326 and the end walls 330, 332 to a flange 338 at the cable end 336. Optionally, the flange 338 may stop loading of the plug housing 302 into the header connector 200.

The plug housing 302 includes a plurality of contact channels 340 extending through the plug housing 302. The contact channels 340 extend from the front 320 to the rear 322. The contact channels 340 are configured to receive corresponding plug contacts 304 (shown in FIG. 3). The cables 102 (shown in FIG. 1) extend from the contact channels 340 at the cable end 336. The plug housing 302 includes separating walls 342 between the contact channels 340. The separating walls 342 electrically isolate the plug contacts 304 from each other.

In an exemplary embodiment, the plug housing 302 includes mounting tabs 344 at the rear 322. The mounting tabs 344 are used to mount the cable cover 308 (shown in FIG. 1) to the plug housing 302. In the illustrated embodiment, the mounting tabs 344 are L-shaped brackets. Other types of mounting tabs may be used in alternative embodiments. Each mounting tab 344 includes a shoulder 346 configured to retain the cable cover 308 on the plug housing 302. In an exemplary embodiment, the mounting tab 344 includes a latching feature 348 used to secure the cable cover 308 relative to the plug housing 302. In the illustrated embodiment, the latching features 348 is an opening configured to receive a latch or other complementary latching feature of the cable cover 308 to retain the cable cover 308 on the plug housing 302. In the illustrated embodiment, multiple latching features 348 are provided. The latching features may allow latching of the cable cover 308 to the plug housing 302 at different locations and/or different orientations.

In an exemplary embodiment, the plug housing 302 includes multiple guide tracks 310. In the illustrated embodiment, a pair of the guide tracks 310 are provided at the first side wall 324. However, greater or fewer guide tracks 310 may be provided at the first side wall 324. In alternative embodiments, one or more of the guide tracks 310 may additionally or alternatively be provided at the second side wall 326.

The guide track 310 defines a camming feature of the plug connector 300 used to transfer linear motion of the slider 210 (shown in FIG. 1) in one direction (sliding direction 106) to linear motion of the plug housing 302 in a different direction (mating direction 104). Each guide track 310 includes an opening 350 at the front 320 to initially receive the slider 210. The guide track 310 includes a ramp 352 extending from the opening 350 to a pocket 354. The pocket 354 defines the end of the guide track 310. For example, the plug connector 300 is fully mated with the header connector 200 when the slider 210 is received in the pocket 354. The slider 210 is configured to transition between the opening 350 at the pocket 354 along the ramp 352. The ramp 352 is angled transverse relative to the front 320 to translate the sliding movement of the slider 210 in the sliding direction 106 to mating movement of the plug connector 300 in the mating direction 104. The angle of the ramp 352 guides mating of the plug connector 300 with the header connector 200 as the slider 210 moves along the ramp 352. The angle of the ramp 352 affects the mating force between the plug connector 300 and the header connector 200. For example, having a steeper angle on the ramp 352 translates to a higher mating force as the slider 210 moves in the sliding direction (more actuation force on the slider 210 required to effectuate mating). Conversely, having a shallower angle on the ramp 352 translates to a lower mating force as the slider 210 moves in the sliding direction (less actuation force on the slider 210 required to effectuate mating).

Figure 6:
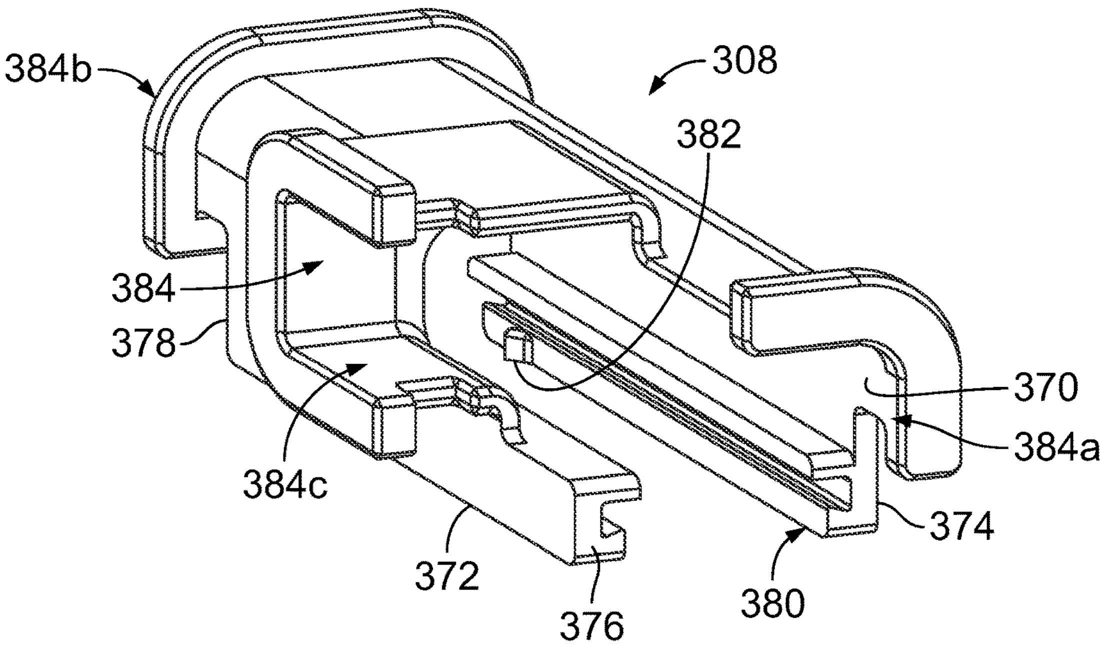
FIG. 6 is a perspective view of the cable cover in accordance with an exemplary embodiment.

FIG. 6 is a perspective view of the cable cover 308 in accordance with an exemplary embodiment. The cable cover 308 includes walls forming a cable chamber 370 that receives the cables 102 (shown in FIG. 1). The cable cover 308 includes a first side 372, a second side 374 opposite the first side 372, a first end 376, and a second end 378 opposite the first end 376.

The cable cover 308 includes a mounting feature 380 used to mount the cable cover 308 to the plug housing 302 (shown in FIG. 5). In the illustrated embodiment, the mounting feature 380 includes slots along the first and second sides 372, 374 that receive the shoulders 346 of the corresponding mounting tabs 344 (shown in FIG. 5). Other types of mounting features may be used in alternative embodiments.

In an exemplary embodiment, the cable cover 308 includes latching features 382 at the front configured to interface with the corresponding latching features 348 (shown in FIG. 5) to secure the cable cover 308 to the plug housing 302. In the illustrated embodiment, the latching features 382 are protrusions or tabs extending inward from the mounting features 380. Other types of latching features may be used in alternative embodiments.

In an exemplary embodiment, the cable cover 308 includes one or more cable exits 384. The cables 102 exit the plug connector 300 through the corresponding cable exit 384. In various embodiments, all of the cables 102 may exit the plug connector 300 through the same cable exit 384. In other various embodiments, groups of the cables 102 may exit from different cable exits 384. The cable exits 384 guide routing of the cables 102 in a particular direction from the plug connector 300. In the illustrated embodiment, the cable cover 308 includes a first cable exit **384*a* at the first end 376, a second cable exit 384*b* at the second end 378, and a third cable exit 384*c* at the first side 372. The cable cover 308 may include greater or fewer cable exits 384 in alternative embodiments. In an exemplary embodiment, the cable cover 308 may be mounted to the plug housing 302 in different orientations to change the exit direction of the third cable exit 384*c* relative to the plug housing 302. For example, in a first orientation, the third cable exit 384*c* may be aligned with the first side wall 324 to exit from the right side, whereas in a second orientation, the third cable exit 384*c* may be aligned with the second side wall 326** to exit from the left side.

Figure 7:
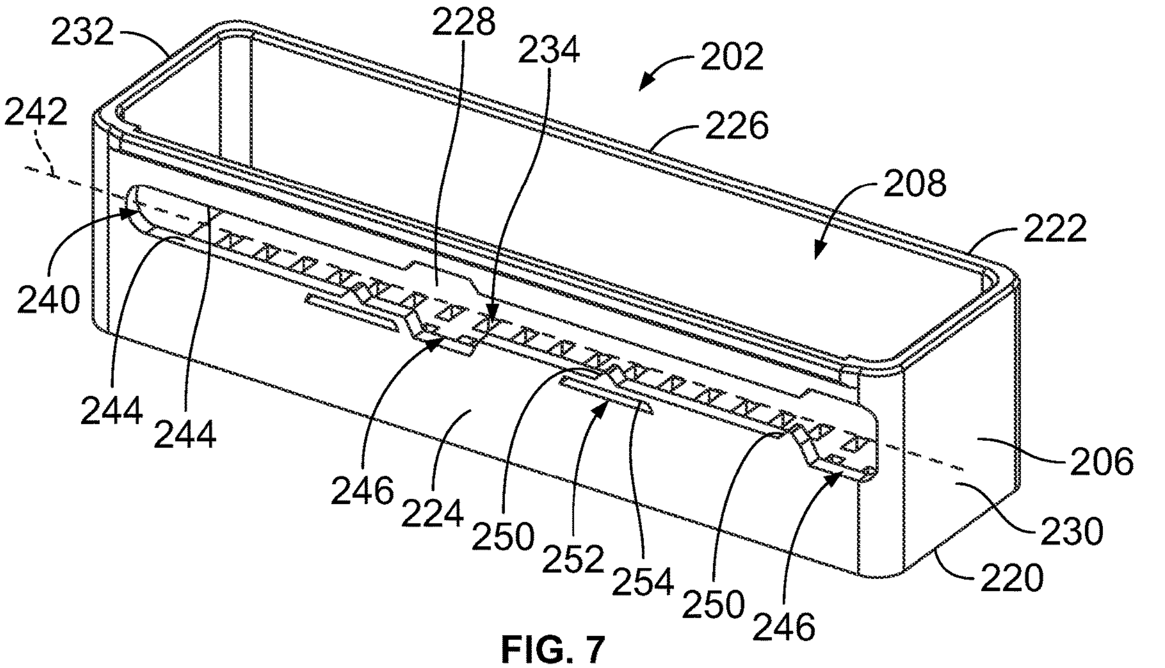
FIG. 7 is a perspective view of the header housing in accordance with an exemplary embodiment.

FIG. 7 is a perspective view of the header housing 202 in accordance with an exemplary embodiment. In an exemplary embodiment, the header housing 202 is manufactured from a dielectric material, such as a plastic material. The header housing 202 may be a molded plastic part. For example, the header housing 202 may be manufactured by an injection molding process.

The header housing 202 extends between a front 220 and a rear 222. The header housing 202 includes a first side wall 224 and a second side wall 226 opposite the first side wall 224. The side walls 224, 226 extend between the front 220 and the rear 222. The header housing 202 includes a base wall 228 at the front 220. The base wall 228 extends between the side walls 224, 226. The header housing 202 includes a first end wall 230 and a second end wall 232 opposite the first end wall 230. The end walls 230, 232 extend between the front 220 and the rear 222 and extend between the first side wall 224 and the second side wall 226. The side walls 224, 226, the base wall 228, and the end walls 330, 332 form the cavity 208. The cavity 208 is open at the rear 322 to receive the plug connector 300 (shown in FIG. 1). In the illustrated embodiment, the header housing 202 is generally rectangular or box shaped. However, the header housing 202 may have other shapes in alternative embodiments.

The header housing 202 includes a plurality of contact channels 234 extending through the base wall 228. The contact channels 234 are open at the front and the rear of the base wall 228. The contact channels 234 are configured to receive corresponding header contacts 204 (shown in FIG. 1).

In an exemplary embodiment, the header housing 202 includes a slider slot 240 in one or more of the walls 206. In the illustrated embodiment, the slider slot 240 is provided in the first side wall 224. The second side wall 226 may additionally or alternatively include the slider slot 240. The slider slot 240 is open to the cavity 208. The slider slot 240 is configured to receive the slider 210 (shown in FIG. 1). In an exemplary embodiment, the slider slot 240 is elongated along a slider axis 242. The slider axis 242 defines the sliding direction 106. In the illustrated embodiment, the slider axis 242 is parallel to the front 220 and the rear 222.

The slider slot 240 is defined by edges 244. In an exemplary embodiment, the slider slot 240 includes pockets 246 along the edges 244 that increase the width of the slider slot 240. The pockets 246 are configured to receive portions of the slider 210 during assembly. The pockets 246 may be provided on both the front and rear edges 244 of the slider slot 240.

In an exemplary embodiment, the header housing 202 includes one or more locating tabs 250 extending into the slider slot 240. The locating tabs 250 are provided along one or more of the edges 244, such as the front edge. The locating tabs 250 decrease the width of the slider slot 240. In an exemplary embodiment, the locating tabs 250 are used to locate the slider 210 within the slider slot 240. For example, the locating tabs 250 may define stop features that position the slider 210 within the slider slot 240. In an exemplary embodiment, the header housing 202 includes relief slot 252 adjacent the locating tabs 250. The latching beams 254 are located between the relief slot 252 and the edge 244. The locating tab 250 extends from the latching beam 254. The latching beam 254 may be flexed into the relief slot 252 to allow the locating tab 250 to be moved outward and increase the width of the slider slot 240, such as to allow the slider 210 to pass by the locating tab 250.

Figure 8:
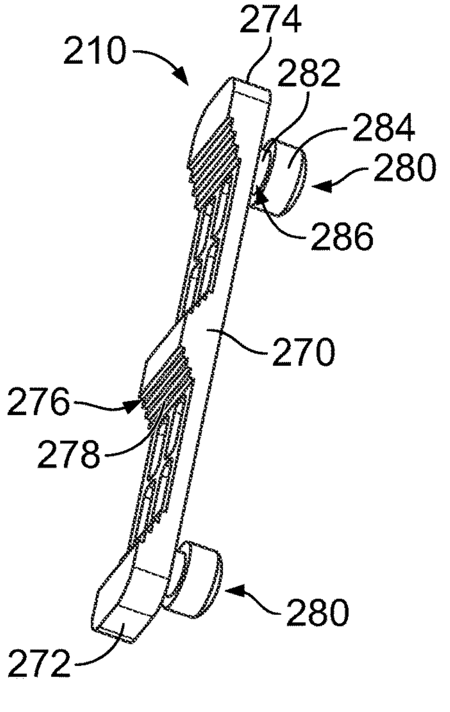
FIG. 8 is a perspective view of a first side of the slider in accordance with an exemplary embodiment.
Figure 9:
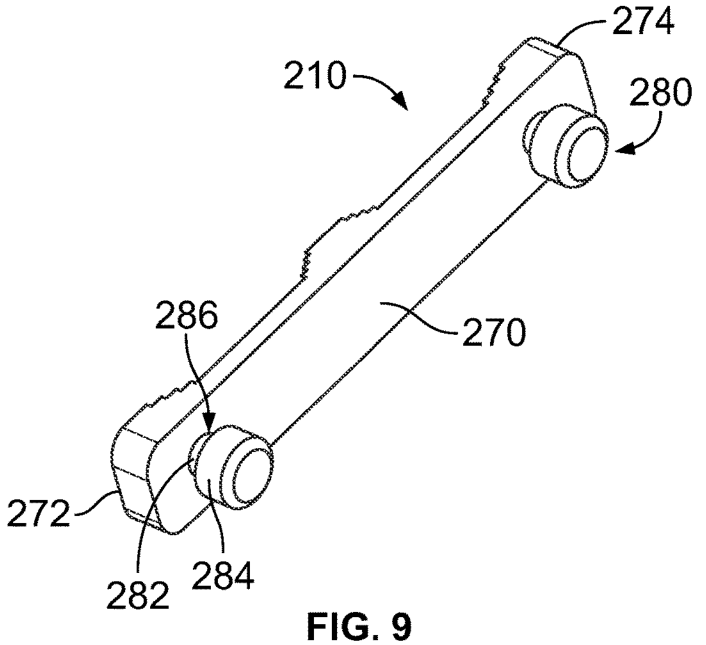
FIG. 9 is a perspective view of a second side of the slider in accordance with an exemplary embodiment.

FIG. 8 is a perspective view of a first side of the slider 210 in accordance with an exemplary embodiment. FIG. 9 is a perspective view of a second side of the slider 210 in accordance with an exemplary embodiment. The slider 210 includes a main body 270 extending between a first end 272 and a second end 274. The main body 270 is thin between an interior side and an exterior side. The slider 210 includes a handle 276 at an exterior side of the main body 270. The handle 276 includes one or more finger grips 278 configured to be pushed or pulled by the operator to slide the slider 210 and the sliding direction.

The slider 210 includes one or more slider posts 280 extending from an interior of the main body 270. In the illustrated embodiment, two of the slider post 280 are provided, such as proximate to the first and second ends 272, 274. Each slider post 280 includes a shank 282 and a head 284 at an end of the shank 282. A receiving space 286 is defined radially outward of the shank 282 between the head and the main body 270 of the slider 210. The receiving space 286 is configured to receive a portion of the header housing 202, such as the corresponding wall 206 of the header housing 202. In an exemplary embodiment, the slider posts 280 are integral with the main body 270 of the slider 210. For example, the slider posts 280 may be co-molded with the main body 270. However, in alternative embodiments, the slider posts 280 may be separate and discrete from the main body 270 and coupled thereto. In various embodiments, the slider posts 280 may be rotatably coupled to the main body 270. For example, the slider posts 280 may be configured to rotate or roll along the plug connector 300 during mating, such as to reduce friction between the slider 210 and the plug connector 300. In other various embodiments, the shank 282 and/or the head 284 may include a low friction sleeve or coating to reduce friction between the slider 210 and the plug connector 300. For example, the low friction sleeve may be a metal sleeve surrounding the shank 282 and/or the head 284.

Figure 10:
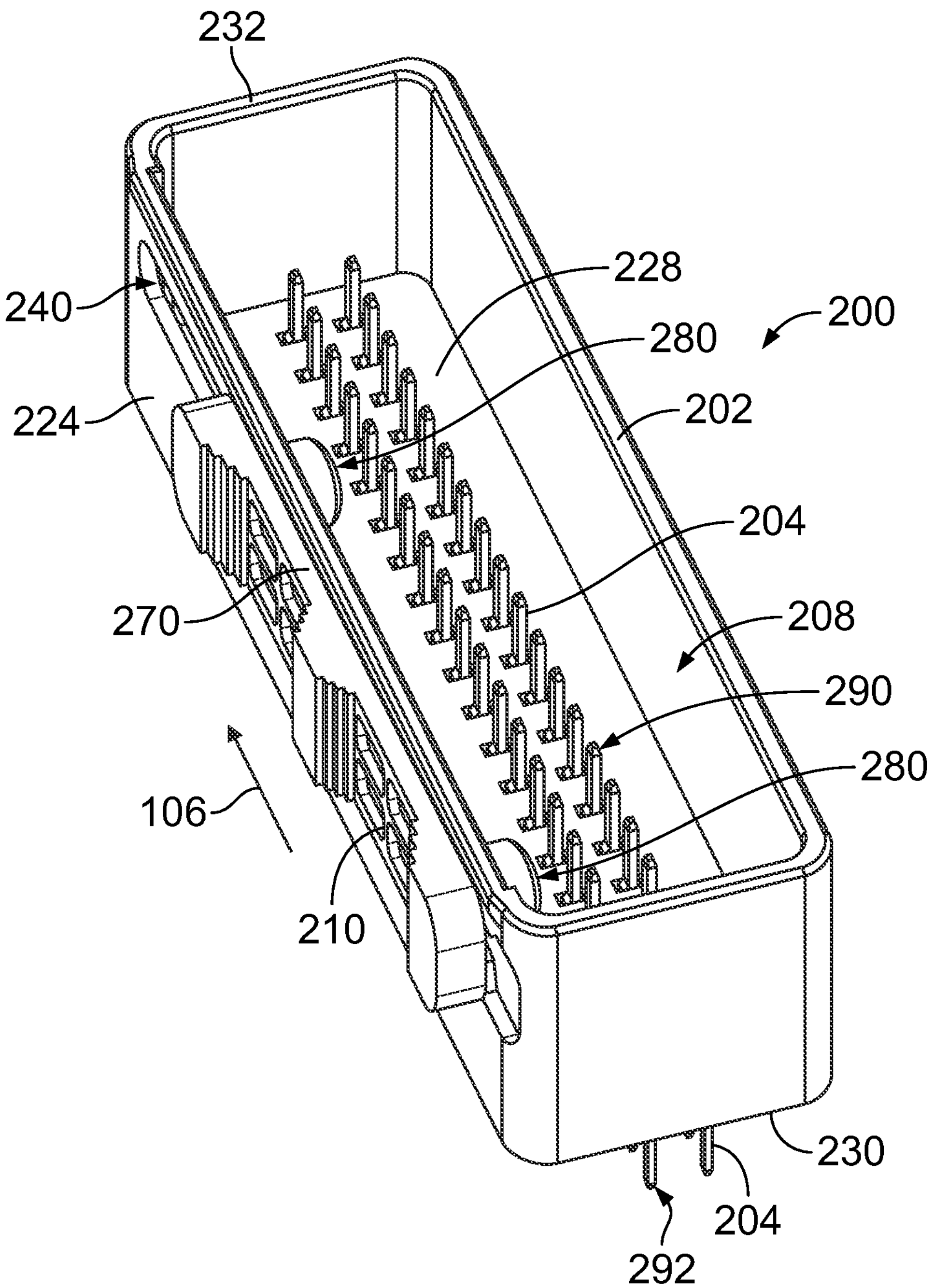
FIG. 10 is a perspective view of the header connector in accordance with an exemplary embodiment.

FIG. 10 is a perspective view of the header connector 200 in accordance with an exemplary embodiment. FIG. 10 illustrates the slider 210 coupled to the first side wall 224. The slider 210 is received in the slider slot 240. The main body 270 of the slider 210 is located at the exterior of the first side wall 224. In an exemplary embodiment, no portion of the slider 210 extends beyond the first end wall 230 or the second end wall 232, which maintains a small footprint for the header connector 200. The slider posts 280 pass through the slider slot 240 into the cavity 208. The slider posts 280 are configured to interface with the plug connector 300 (shown in FIG. 1) when the plug connector 300 is mated to the header connector 200. The slider 210 is slidable in a sliding direction 106 within the slider slot 240. The slider slot 240 controls the sliding movement of the slider 210 relative to the header housing 202. For example, the slider slot 240 limits movement of the slider 210 in a linear sliding direction.

The header contacts 204 are coupled to the header housing 202. The header contacts 204 extend through the base wall 228 into the cavity 208 for mating with the plug connector 300. Each header contact 204 includes a mating end 290 located within the cavity 208 for mating with the plug connector 300. In the illustrated embodiment, the mating end 290 includes a pin configured be received within a socket of the corresponding plug contact 304 of the plug connector 300. However other types of mating interfaces may be provided at the mating end 290 in alternative embodiments, such as a socket, a spring beam, a tuning fork, and the like. In an exemplary embodiment, each header contact 204 includes a terminating end 292 opposite the mating end 290. In the illustrated embodiment, the terminating end 292 includes a solder tail configured to be soldered to the circuit board (not shown). Other types of interfaces may be provided in alternative embodiments, such as compliant pins or eye-of-the-needle pins for termination to the circuit board or solder pads, crimp barrels, or other types of interfaces for termination to corresponding cables.

Figure 11:
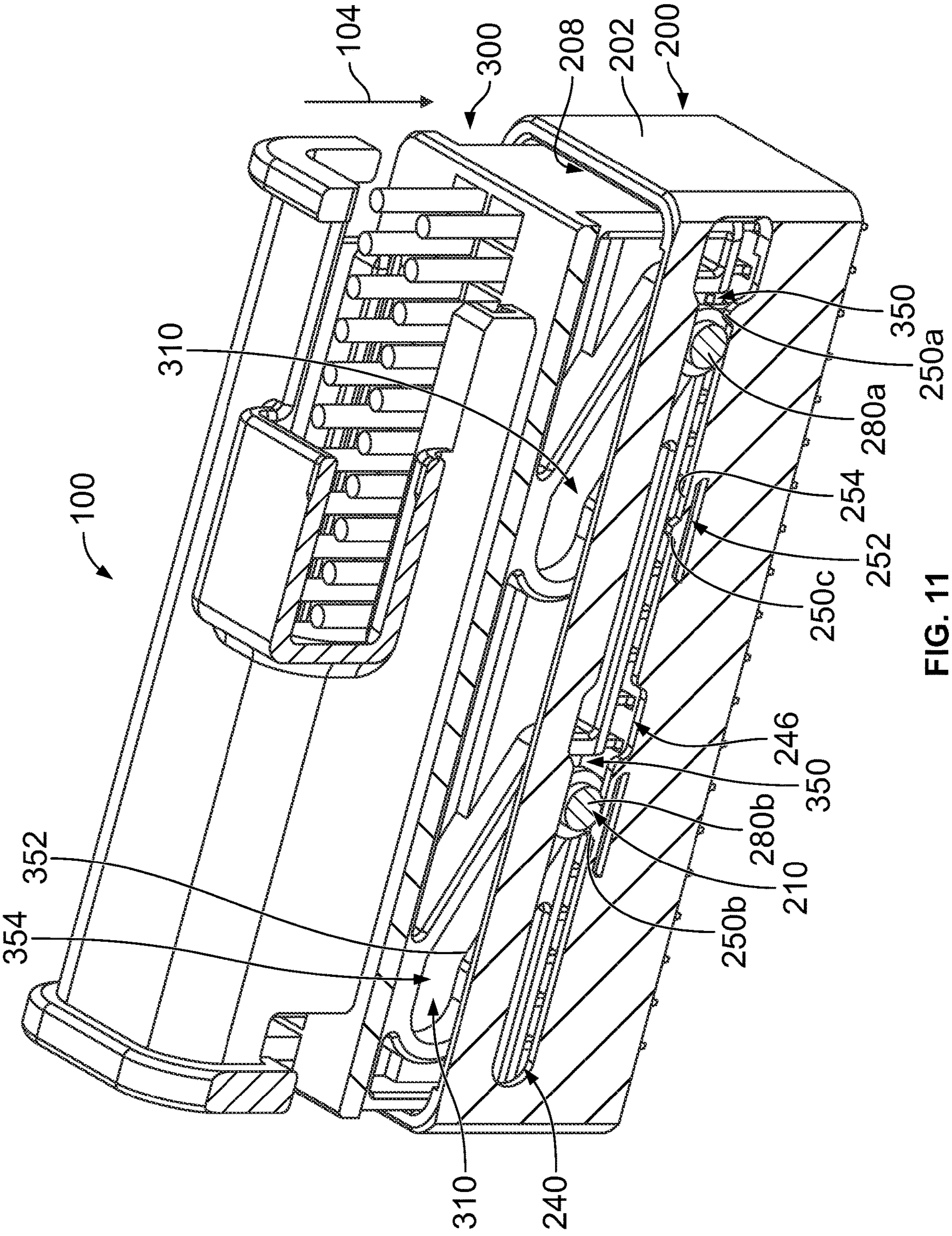
FIG. 11 is a perspective view of the communication system showing the plug connector partially mated with the header connector in accordance with an exemplary embodiment.

FIG. 11 is a perspective view of the communication system 100 showing the plug connector 300 partially mated with the header connector 200. A portion of the slider 210 has been removed to illustrate the interaction between the slider 210 and the plug connector 300 as well as the interaction between the slider 210 and the slider slot 240.

When assembled, the slider 210 is coupled to the header housing 202. The slider posts 280 are received in the slider slot 240. During assembly, the slider posts 280 are initially loaded into the slider slot 240 through the pockets 246. The slider 210 may then be shifted in the sliding direction to a preload position (shown in FIG. 11). In the preload position, the slider posts 280 are positioned relative to the header housing 202 for receipt in the guide track 310 when the plug connector 300 is loaded into the cavity 208 of the header housing 202. For example, the slider posts 280 are aligned with the openings 350 of the guide tracks 310. The locating tabs 250 are used to locate the slider posts 280 in the preload position. For example, the slider posts 280 may be captured between a first locating tab 250*a* and a second locating tab 250*b*. In the illustrated embodiment, the first locating tab 250*a* is located to the left side of the first slider post 280*a* and the second locating tab 250*b* is located to the right side of the second slider post 280*b*. The first locating tab 250*a* stops sliding movement of the slider 210 in a leftward direction. The second locating tab 250*b* stops sliding movement of the slider 210 in a right or direction. Additional locating tabs may be used in alternative embodiments, such as locating tabs 250 on both sides of each slider post 280. The resistance provided by the locating tabs 250 may be overcome by unlatching the latching beam 254 and forcing the locating tab 250 outward into the space defined by the relief slot 252. The locating tabs 250 may be unlatched by moving the slider 210 in the sliding direction with sufficient force to overcome the latching force.

During mating, the slider posts 280 are moved within the guide track 310 to assist mating of the plug connector 300 with the header connector 200. As the slider posts 280 move within the guide tracks 310 along the ramps 352 to the pockets 354, the linear sliding movement of the slider 210 causes movement of the plug connector 300 in the mating direction 104. In an exemplary embodiment, the slider 210 is moved (leftward in the illustrated orientation) to an advanced position. In an exemplary embodiment, a third locating tab 250*c* is provided to retain the slider 210 in the advanced position. For example, the second slider post 280*b* is moved to the left side of the third locating tab 250*c*. In the advanced position, the third locating tab 250*c* is located to the right side of the second slider posts 280*b* to resist movement of the slider 210 in a retracted direction. The third locating tab 250*c* holds the slider 210 in the advanced position to resist inadvertent on mating of the plug connector 300 from the header connector 200.

Figure 12:
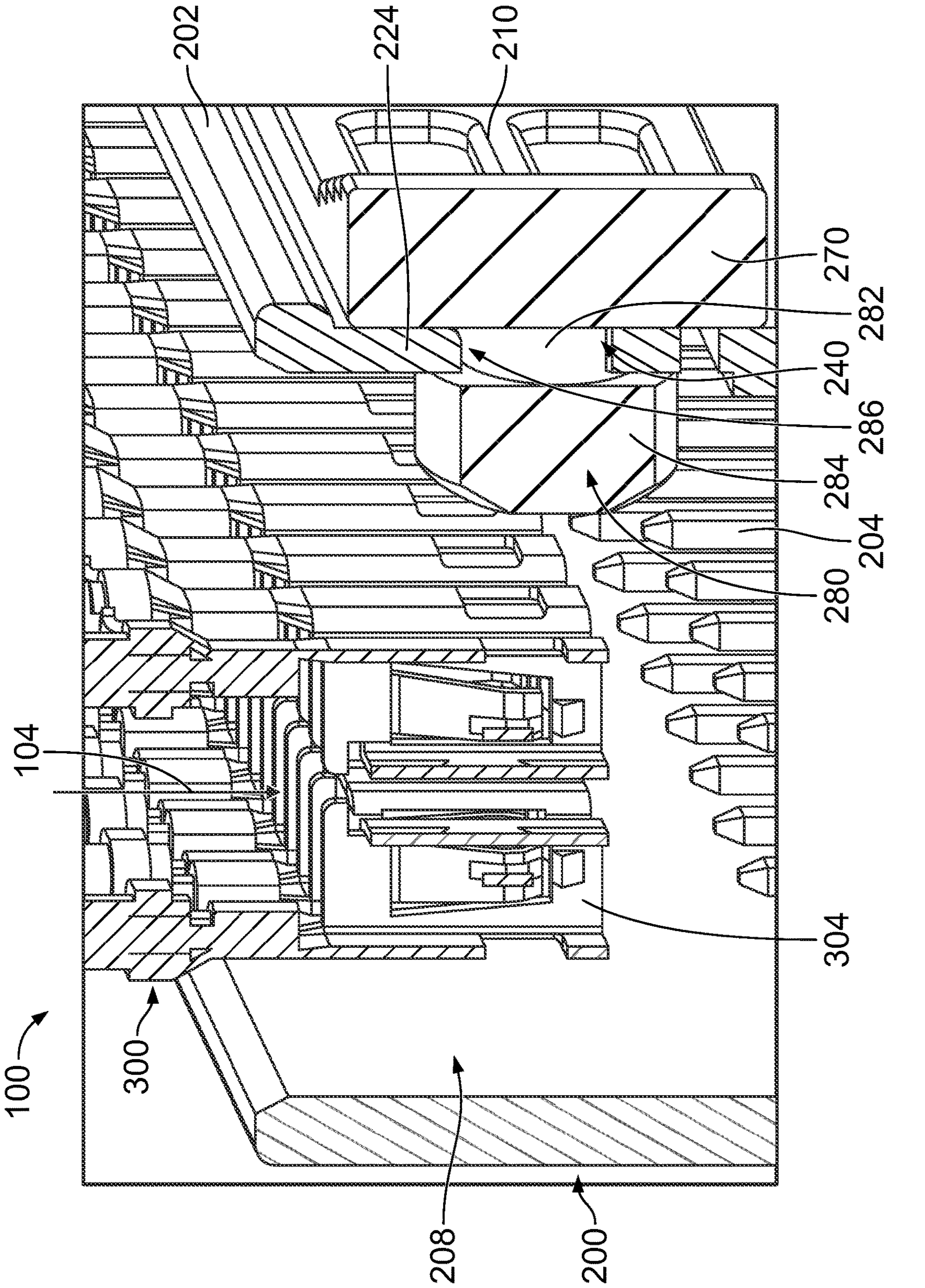
FIG. 12 is a partial sectional view of the communication system in accordance with an exemplary embodiment.

FIG. 12 is a partial sectional view of the communication system 100 in accordance with an exemplary embodiment. The plug housing 302 (shown in FIG. 11) is removed to illustrate the slider 210, the header contacts 204 and the plug contacts 304 within the cavity 208 of the header housing 202. The slider 210 is coupled to the first side wall 224 of the header housing 202. The shank 282 of the slider post 280 is received in the slider slot 240. The head 284 of the slider post 280 is located in the cavity 208. The first side wall 224 is received in the receiving space 286 between the head 284 and the main body 270 of the slider 210. The slider 210 is captured in the slider slot 240 by the first side wall 224 being received in the receiving space 286.

In the illustrated embodiment, the plug contacts 304 are shown as socket contacts configured to be mated with the header contacts 204. The plug contacts 304 and the header contacts 204 are arranged in multiple rows and columns. Any number of the plug contacts 304 and the header contacts 204 may be provided within the plug connector 300 and the header connector 200 for the particular application. Mating forces are induced by the friction between the plug contacts 304 and the header contacts 204 during mating. The mating forces may be overcome using the mating assistance provided by the slider 210. For example, the linear sliding movement of the slider 210 is transferred to the plug connector 300 to move the plug connector 300 in the mating direction 104.

Figure 13:
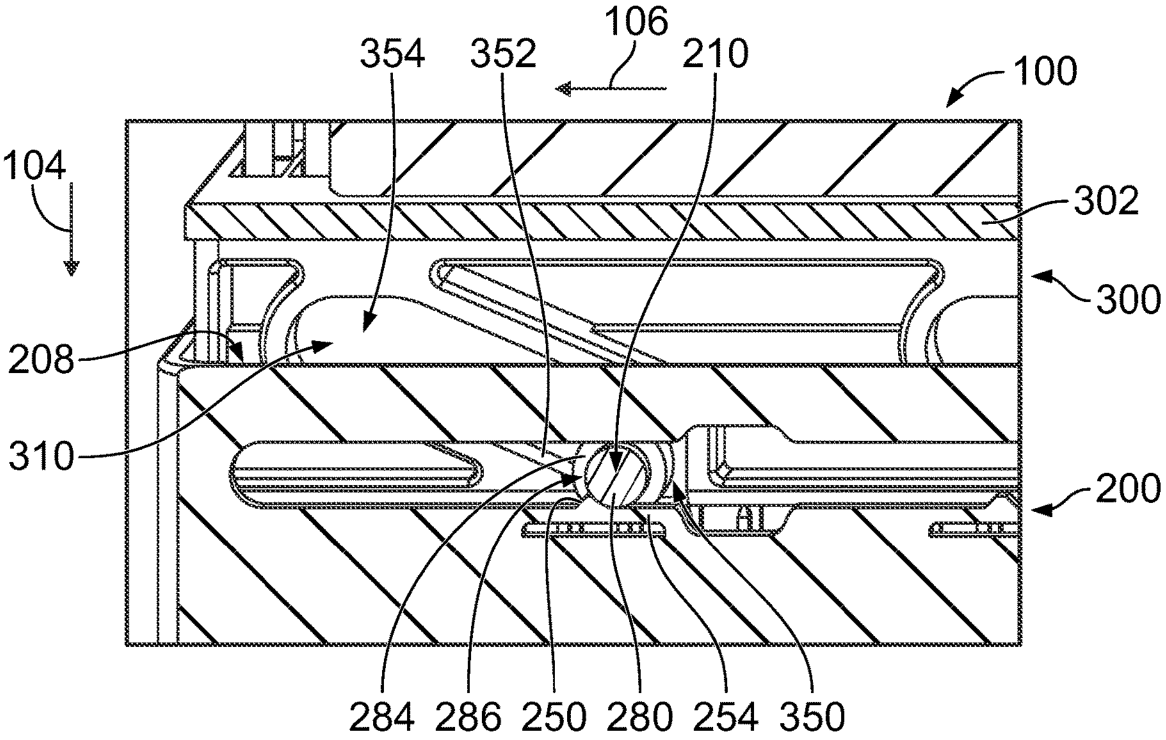
FIG. 13 is a perspective view of a portion of the communication system showing the plug connector partially mated with the header connector in accordance with an exemplary embodiment.
Figure 14:
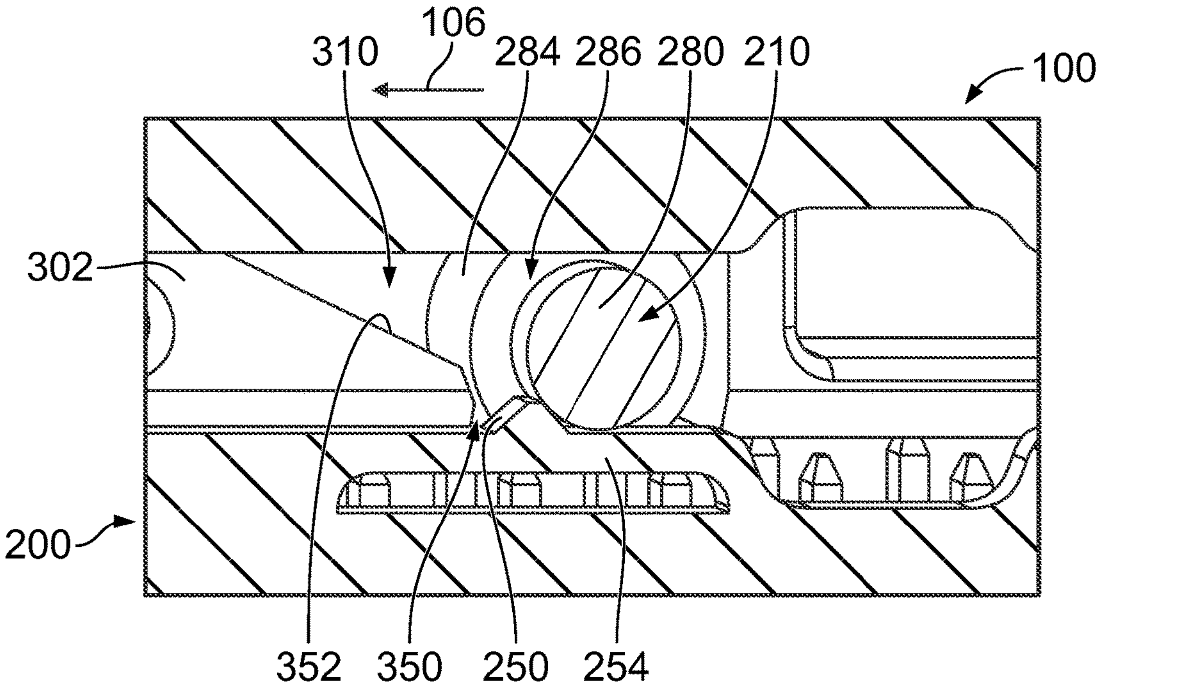
FIG. 14 is a perspective view of a portion of the communication system showing the plug connector partially mated with the header connector in accordance with an exemplary embodiment.

FIG. 13 is a perspective view of a portion of the communication system 100 showing the plug connector 300 partially mated with the header connector 200. FIG. 14 is a perspective view of a portion of the communication system 100 showing the plug connector 300 partially mated with the header connector 200. A portion of the slider 210 (for example, the main body) has been removed to illustrate the slider posts 280.

The slider 210 is shown in the preload position. In the preload position, the slider post 280 is aligned with the opening 350 of the guide tracks 310 such that the head 284 of the slider post 280 may be loaded into the guide track 310 as the plug connector 300 is plugged into the cavity 208 of the header connector 200. The locating tabs 250 are used to locate the slider posts 280 in the preload position. Once the slider post 280 is initially received in the guide track 310, the slider 210 may be moved in the sliding direction 106 from the retracted position (corresponding to the preload position) to the advanced position (leftward of the position shown in FIGS. 13 and 14). The locating tabs 250 may be unlatched by moving the slider 210 in the sliding direction with sufficient force to overcome the latching force. The latching beam 254 may be deflected outward into the relief space 286 to provide clearance for the slider post 280 to move past the latching beam 254. As the slider 210 moves in the sliding direction 106, the slider post 280 is moved within the guide track 310 to assist mating of the plug connector 300 with the header connector 200. For example, the slider posts 280 moves along the ramp 352 to the pockets 354. The sliding of the slider 210 causes the plug housing 302 to advanced forward in the mating direction 104.

Figure 15:
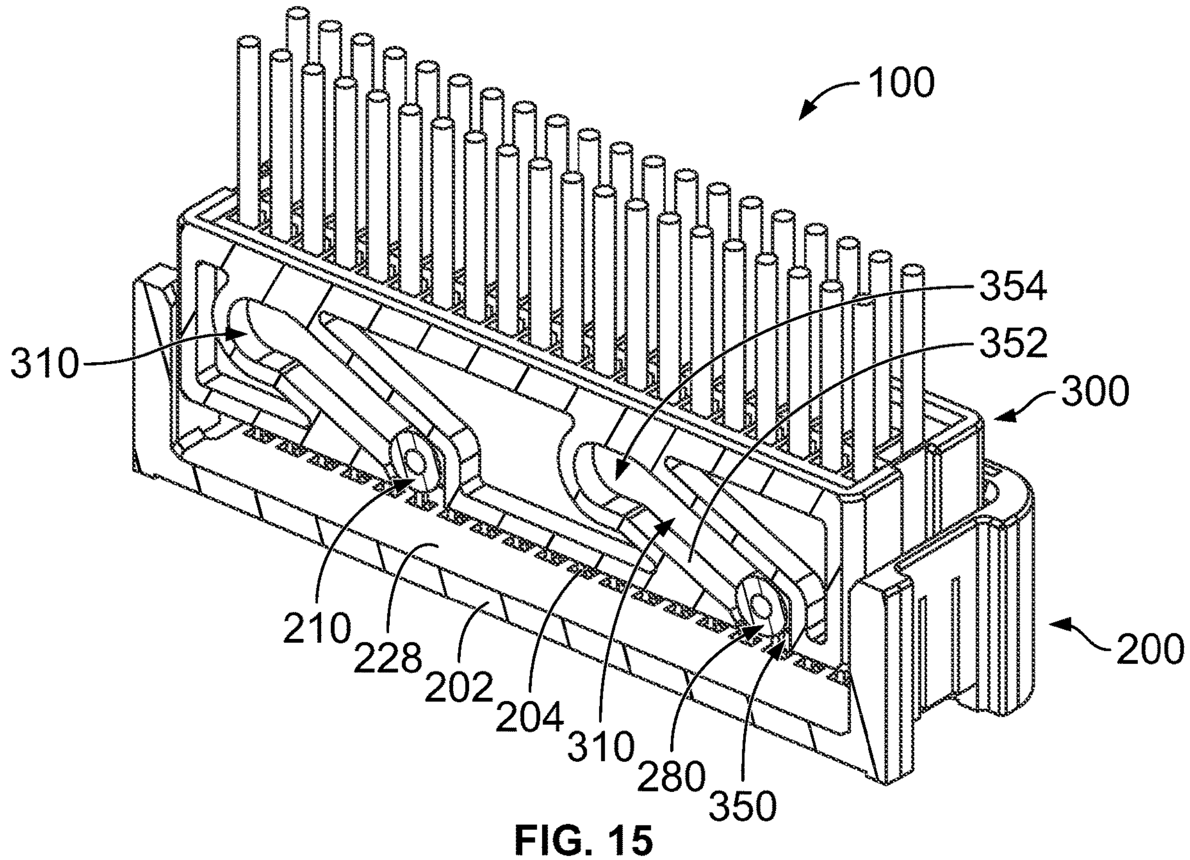
FIG. 15 is a partial sectional view of the communication system showing the plug connector partially mated with the header connector in accordance with an exemplary embodiment.
Figure 16:
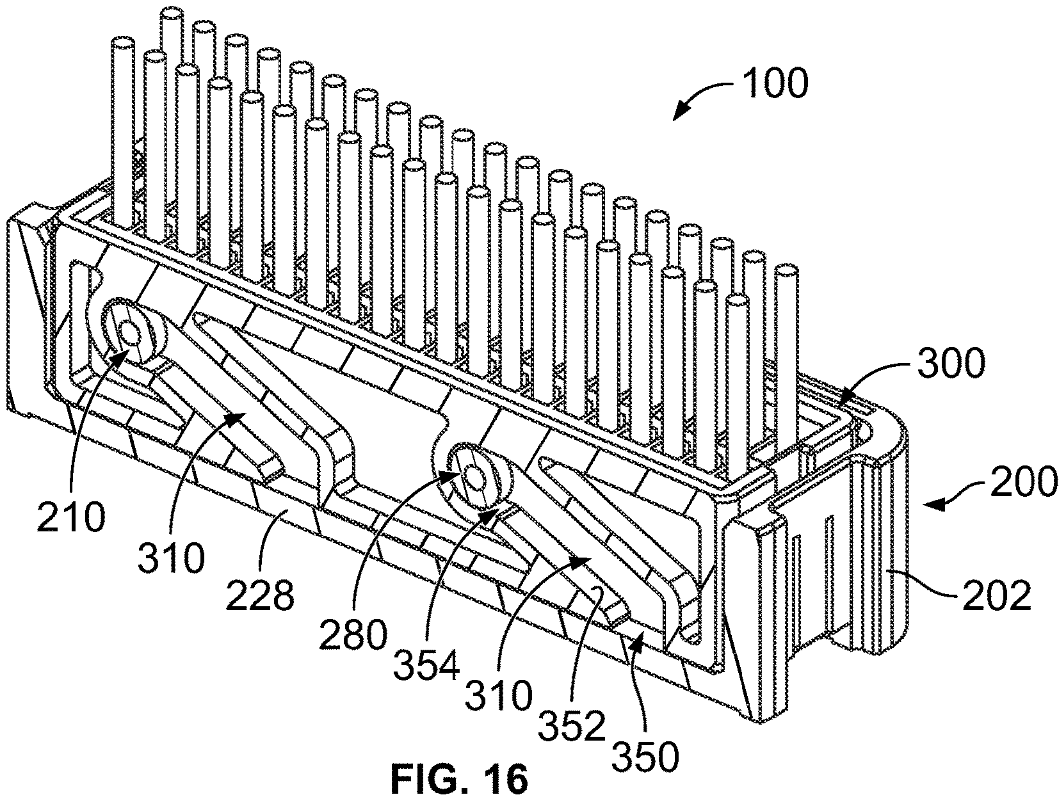
FIG. 16 is a partial sectional view of the communication system showing the plug connector fully mated with the header connector in accordance with an exemplary embodiment.

FIG. 15 is a partial sectional view of the communication system 100 showing the plug connector 300 partially mated with the header connector 200. FIG. 16 is a partial sectional view of the communication system 100 showing the plug connector 300 fully mated with the header connector 200. The plug connector 300 is advanced toward the base wall 228 of the header housing 202 in the mated position. The plug contacts 304 are mated with the header contacts 204 in the mated position. The slider 210 is used to provide mating assistance of the plug connector 300 with the header connector 200. For example, the slider posts 280 advance through the guide tracks 310 from the openings 350 (FIG. 15) to the pockets 354 (FIG. 16). The angles and the lengths of the ramps 352 control the mating distance from the preloaded position (FIG. 15) to the mated position (FIG. 16). The angles of the ramps 352 control the amount of sliding force needed to mate the plug connector 300 with the header connector 200. In an alternative embodiment, rather than having two guide tracks 310, a single guide track may be provided having a shallower angle and/or longer ramp 352 to reduce the sliding force needed for mating the plug connector 300 with the header connector 200.

Figure 17:
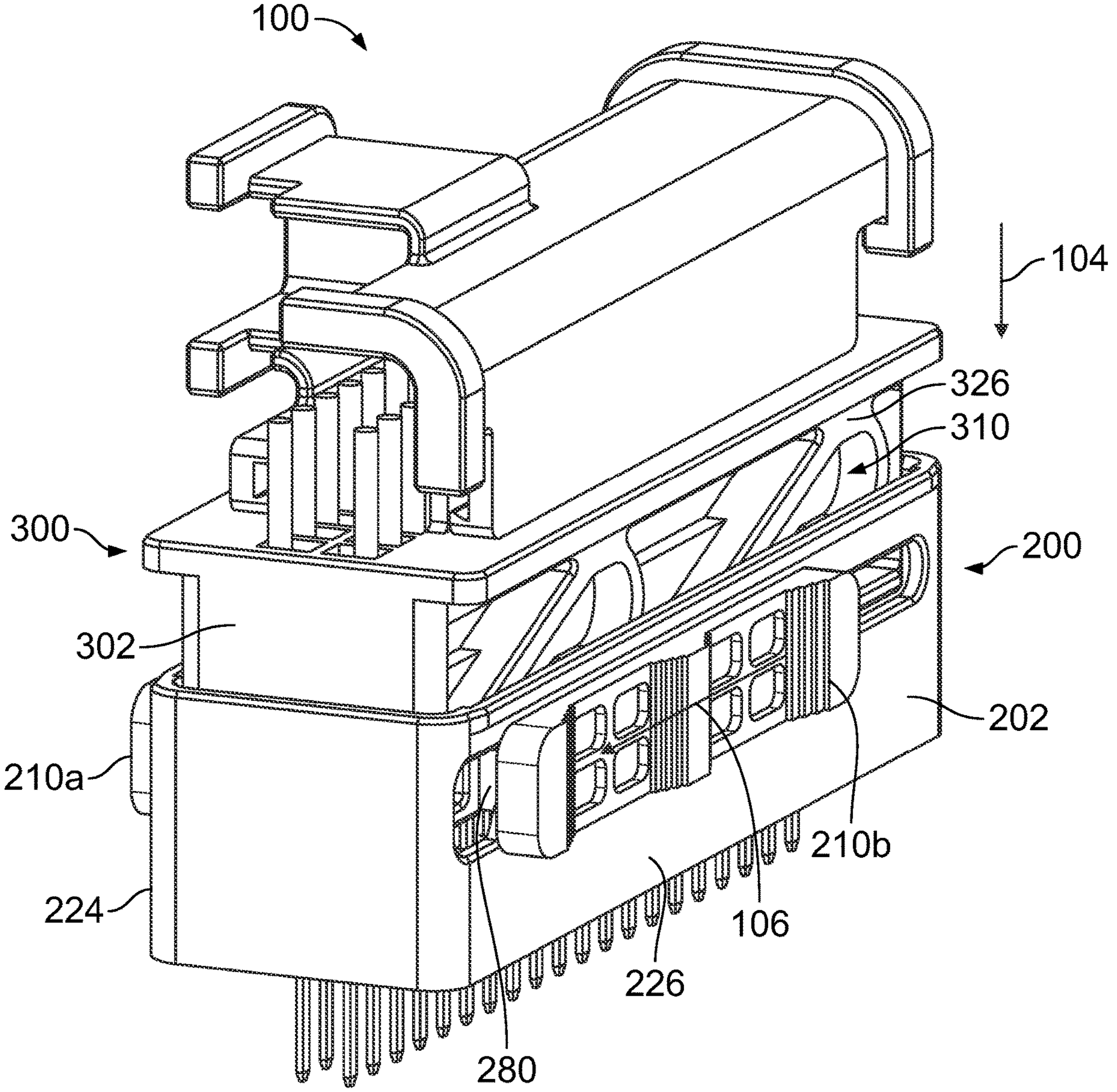
FIG. 17 is a perspective view of the communication system in accordance with an exemplary embodiment.

FIG. 17 is a perspective view of the communication system 100 in accordance with an exemplary embodiment. In the illustrated embodiment, the communication system 100 includes a pair of the mating assist devices to assist mating the plug connector 300 with the header connector 200. For example, the header connector 200 includes a first slider 210*a* at the first side wall 224 of the header housing 202 and a second slider 210*b* at the second side wall 226 of the header housing 202. The second slider 210*b* includes corresponding slider posts 280 that interface with the plug connector 300. The plug connector 300 includes guide tracks 310 at the second side wall 326 of the plug housing 302 that interface with the second slider 210*b*.

The first and second sliders 210*a*, 210*b* are independently movable relative to the header housing 202. For example, the operator may grip the first slider 210*a* with a forefinger and grip the second slider 210*b* with a thumb to pull the sliders 210*a*, 210*b* in the sliding direction 106. The first slider 210*a* is used to drive the first side of the plug connector 300 in the mating direction 104 and the second slider 210*b* is used to drive the second side of the plug connector 300 in the mating direction 104.

Figure 18:
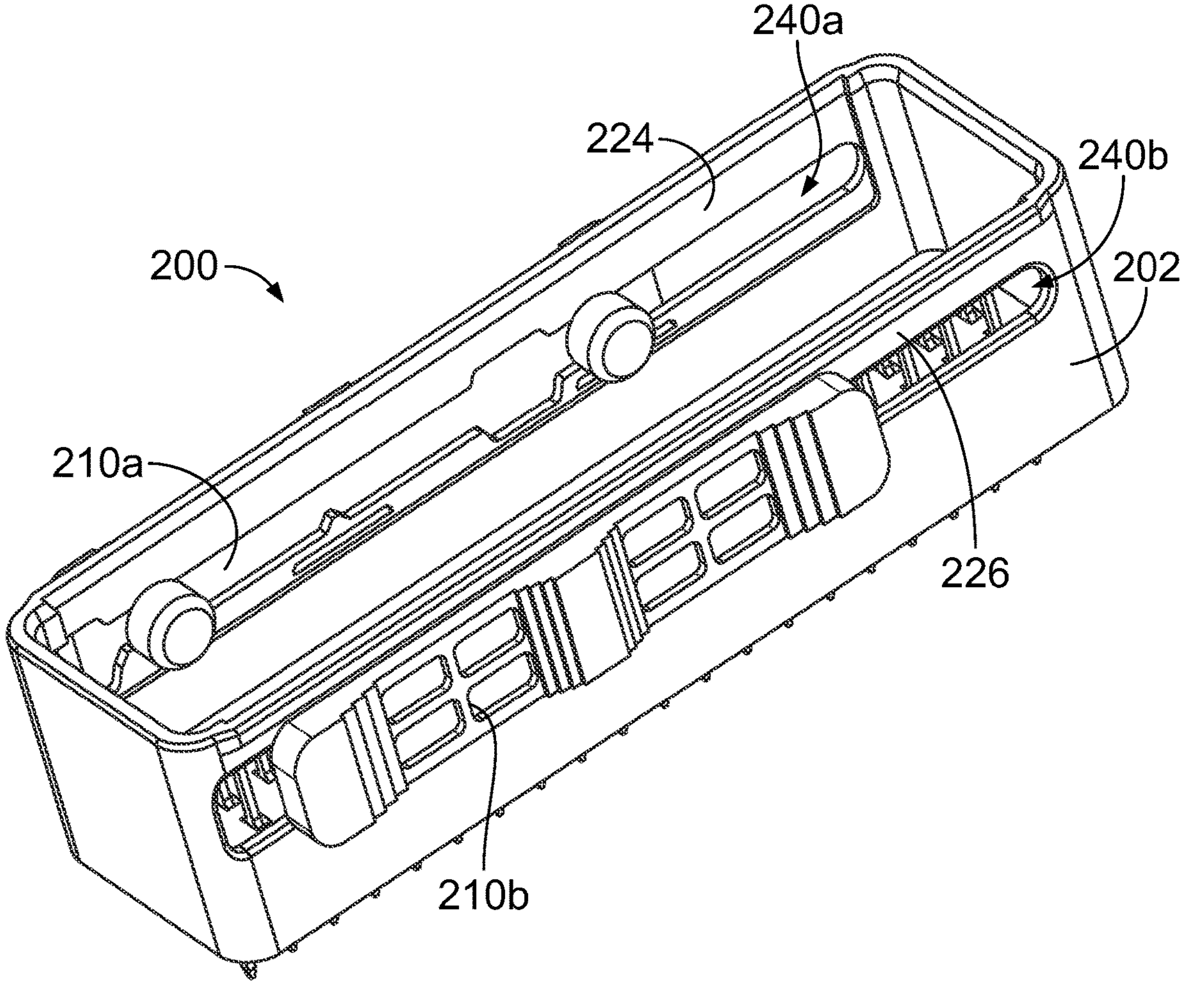
FIG. 18 is a perspective view of the header connector in accordance with an exemplary embodiment.

FIG. 18 is a perspective view of the header connector 200 in accordance with an exemplary embodiment. FIG. 18 shows the header connector 200 having the first slider 210*a* and the second slider 210*b*. The header housing 202 includes a first slider slot 240*a* in the first side wall 224 and a second slider slot 240*b* in the second side wall 226.

Figure 19:
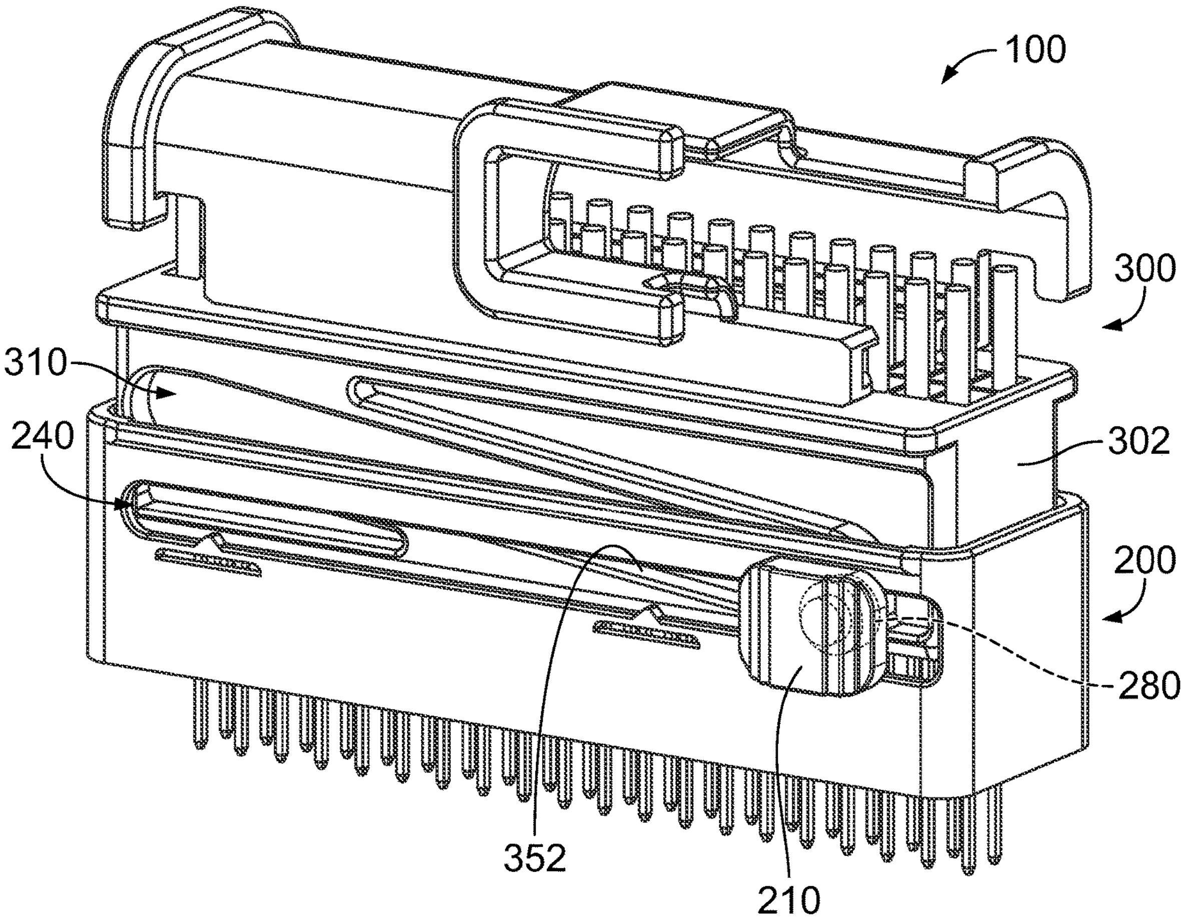
FIG. 19 is a perspective view of the communication system in accordance with an exemplary embodiment showing the plug connector mated with the header connector.
Figure 20:
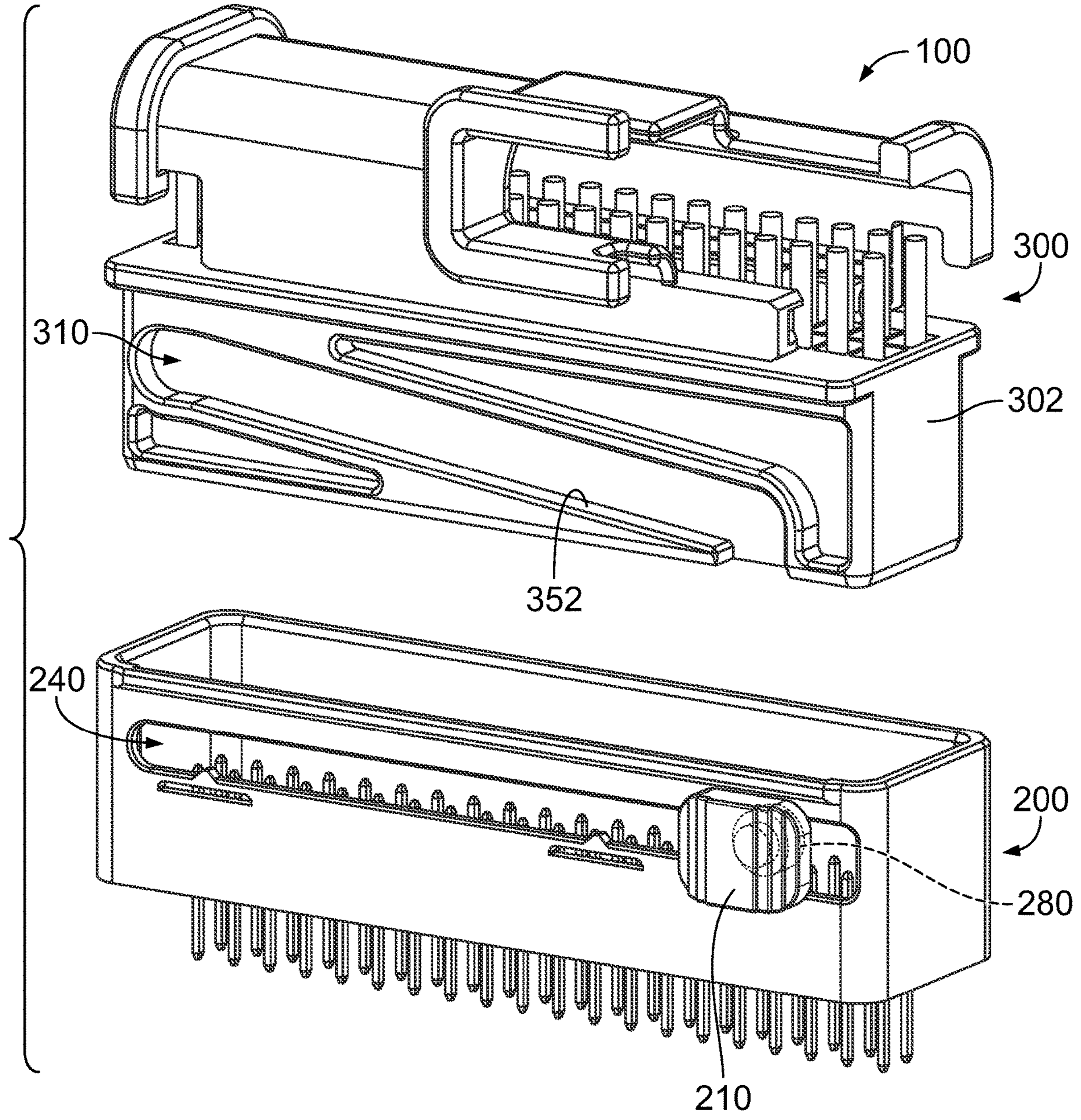
FIG. 20 is an exploded view of the communication system in accordance with an exemplary embodiment showing the plug connector poised for mating with the header connector.

FIG. 19 is a perspective view of the communication system 100 in accordance with an exemplary embodiment showing the plug connector 300 mated with the header connector 200. FIG. 20 is an exploded view of the communication system 100 in accordance with an exemplary embodiment showing the plug connector 300 poised for mating with the header connector 200. In the illustrated embodiment, the plug connector 300 has a single guide track 310 rather than having two guide tracks 310. The slider 210 has a single slider post 280 rather than having two slider posts 280. The single guide track 310 may have a shallower angle and/or longer ramp 352 across the length of the plug housing 302 to reduce the sliding force needed for mating the plug connector 300 with the header connector 200. For example, in the illustrated embodiment, the slider post 280 is configured to slide almost the entire length of the plug housing 302 (for example, almost the entire length of the slider slot 240).

Figure 21:
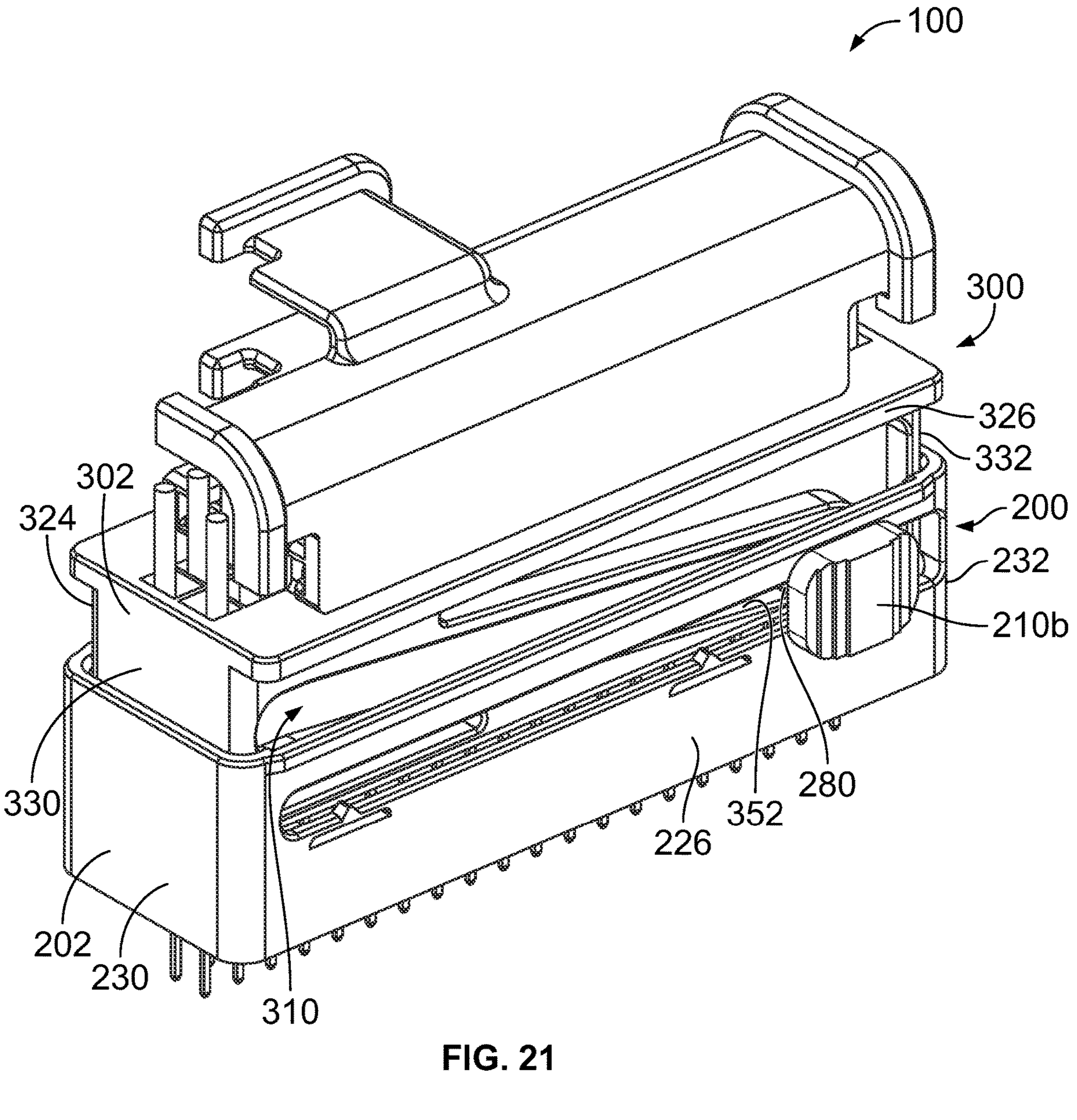
FIG. 21 is a perspective view of the communication system in accordance with an exemplary embodiment showing the plug connector mated with the header connector.
Figure 22:
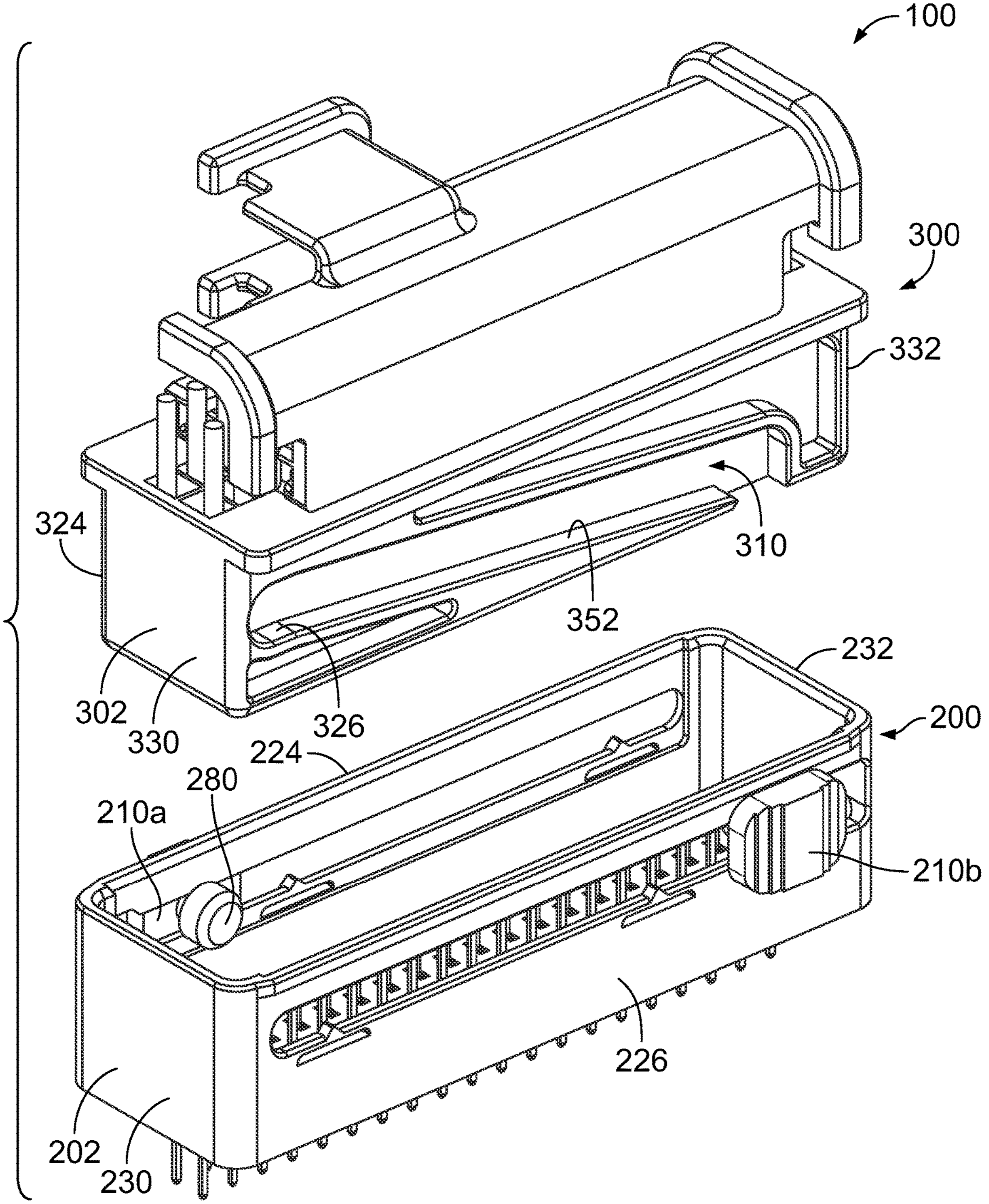
FIG. 22 is an exploded view of the communication system in accordance with an exemplary embodiment showing the plug connector poised for mating with the header connector.

FIG. 21 is a perspective view of the communication system 100 in accordance with an exemplary embodiment showing the plug connector 300 mated with the header connector 200. FIG. 22 is an exploded view of the communication system 100 in accordance with an exemplary embodiment showing the plug connector 300 poised for mating with the header connector 200.

In the illustrated embodiment, the communication system 100 includes a pair of the mating assist devices to assist mating the plug connector 300 with the header connector 200. For example, the header connector 200 includes a first slider 210*a* at the first side wall 224 of the header housing 202 and a second slider 210*b* at the second side wall 226 of the header housing 202. The plug connector 300 includes a first guide track (not shown) at the first side wall 324 and a second guide track 310 at the second side wall 326 of the plug housing 302 that interface with the first and second sliders 210*a*, 210*b*, respectively.

In the illustrated embodiment, each side of the plug connector 300 includes a single guide track 310, rather than having multiple guide tracks 310 on each side. The guide tracks 310 have a shallower angle and/or longer ramp 352 across the length of the plug housing 302 compared to embodiments having multiple guide tracks 310 at each side of the plug connector 300. The longer ramp and shallower angle reduce the sliding force needed for mating the plug connector 300 with the header connector 200. In an exemplary embodiment, the guide tracks 310 advance in opposite directions. For example, the first guide track (shown in FIGS. 19-20) advances from the first end wall 330 to the second end wall 332 whereas the second guide track 310 advances from the second end wall 332 to the first end wall 330. The sliders 210*a*, 210*b* each have a single slider post 280 rather than having two slider posts 280. The first slider 210*a* is advanced from the first end wall 230 to the second end wall 232 whereas the second slider 210*b* advances from the second end wall 232 to the first end wall 230. The sliders are moved in opposite directions during mating. However, the guide tracks 310 may be oriented in the same direction in alternative embodiments such that the sliders 210*a*, 210*b* are moved in the same direction during mating.

Figure 23:
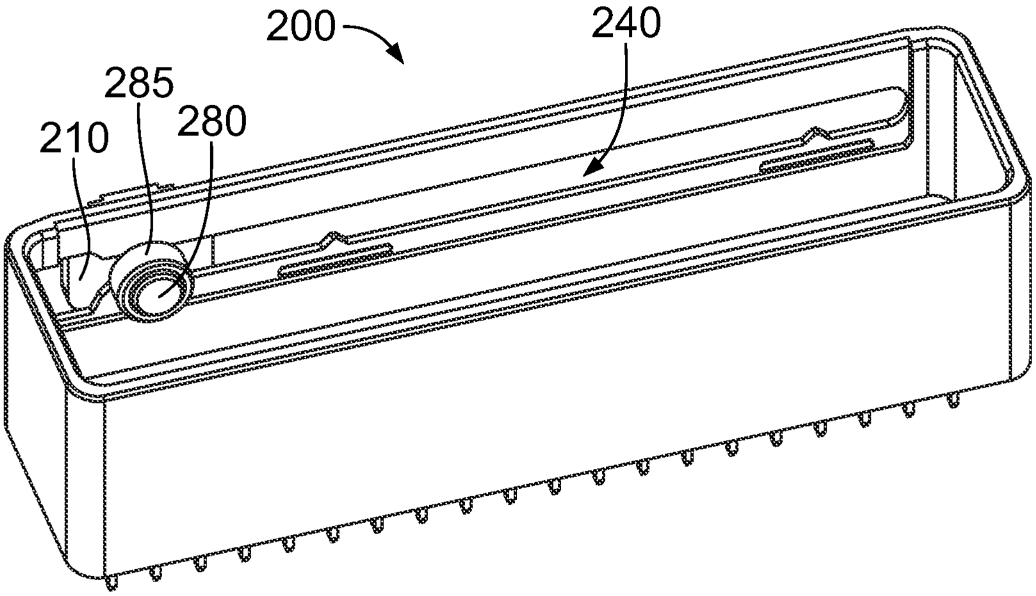
FIG. 23 is a perspective view of the header connector showing the slider in accordance with an exemplary embodiment.
Figure 24:
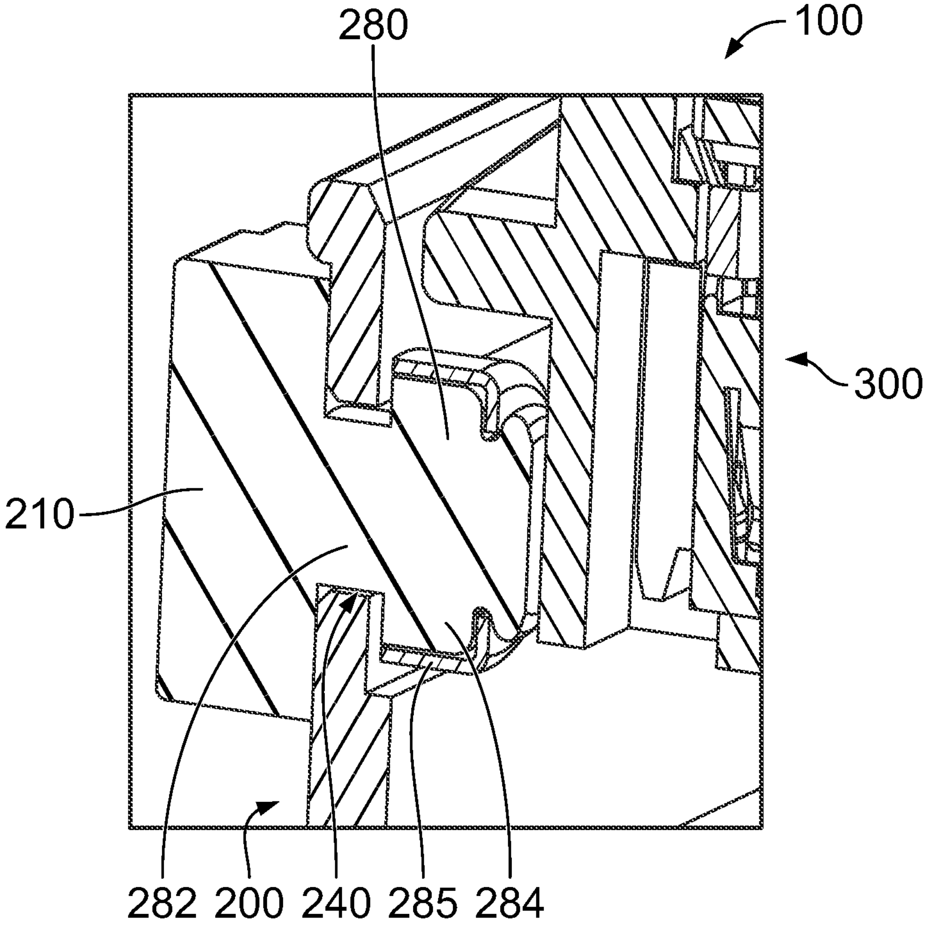
FIG. 24 is a cross sectional view of a portion of the communication system showing the slider in accordance with an exemplary embodiment.

FIG. 23 is a perspective view of the header connector 200 showing the slider 210 in accordance with an exemplary embodiment. FIG. 24 is a cross sectional view of a portion of the communication system 100 showing the slider 210 in accordance with an exemplary embodiment. In an exemplary embodiment, the slider 210 includes a low friction sleeve 285 coupled to the slider posts 280. The low friction sleeve 285 reduces friction between the slider 210 and the plug connector 300 to make mating easier. The low friction sleeve 285 may be a metal sleeve coupled to the slider posts 280. The low friction sleeve 285 is coupled to the head 284 and is configured to engage and slide along the plug housing 302, such as within the guide track 310. The low friction sleeve 285 may be coupled to the shank 282 to engage and slide along the header housing 302, such as within the slider slot 240.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical connector comprising:

a housing having walls forming a cavity configured to receive a mating electrical connector, the walls including a base wall, a first side wall at a first side, a second side wall at a second side, a first end wall at a first end, and a second end wall at a second end, the base wall provided at a rear of the housing, the base wall including contact channels, the first side wall including a slider slot open to the cavity;

contacts held in the contact channels, the contacts having mating ends configured to be mated with the mating electrical connector; and a slider coupled to the first side wall of the housing and actuated from the first side of the housing, the slider received in the slider slot and movable in a sliding direction within the slider slot, the slider including a slider post extending into the cavity and movable within the cavity as the slider moves in the sliding direction, the slider post configured to be received in a guide track of the mating electrical connector to locate the mating electrical connector within the cavity of the housing.

2. The electrical connector of claim 1, wherein the slider includes a handle at an exterior of the slider and contained within the footprint of the first side wall, the handle being slid along the first side wall between a retracted position and an advanced position.

3. The electrical connector of claim 1, wherein the slider post is configured to advance the mating electrical connector in a mating direction as the slider is slid in the sliding direction.

4. The electrical connector of claim 1, wherein the slider post includes a shank and a head at an end of the shank, a receiving space being defined radially outward of the shank between the head and a main body of the slider, the first side wall being received in the receiving space, the head configured to be received in the guide track.

5. The electrical connector of claim 1, wherein the slider includes a main body, the slider post extending inward from the main body, the main body being located at an exterior of the first side wall, the main body having an area smaller than an area of the first side wall.

6. The electrical connector of claim 1, wherein the first and second side walls are longer than the first and second end walls, the slider does not extend beyond either of the first or second end walls, the slider does not extend beyond the base wall.

7. The electrical connector of claim 1, wherein the first side wall includes a locating tab extending into the slider slot, the locating tab interfacing with the slider post to locate the slider along the slider slot.

8. The electrical connector of claim 7, wherein the first side wall includes a relief slot adjacent the locating tab and a latching beam between the relief slot and the locating tab, the latching beam flexing into the relief slot to allow the locating tab to move from a latched position to an unlatched position, the slider post allowed to move past the locating tab when the locating tabs in the unlatched position.

9. The electrical connector of claim 1, wherein the first side wall includes a first locating tab extending into the slider slot and a second locating tab extending into the slider slot, the second locating tab being axially offset from the first locating tab, the slider being movable within the slider slot between a retracted position and an advanced position, the first locating tab interfacing with the slider post in the retracted position, the second locating tab interfacing with the slider post in the advanced position.

10. The electrical connector of claim 1, wherein the second side wall includes a second slider slot open to the cavity, the electrical connector further comprising a second slider received in the second slider slot, the second slider including a second slider post extending into the cavity, the second slider post configured to be received in the second guide track of the mating electrical connector, the second slider being independently movable relative to the slider.

11. The electrical connector of claim 1, wherein the slider post is rotatable relative to a main body of the slider.

12. The electrical connector of claim 1, further comprising a metal sleeve on an exterior of the slider post, the metal sleeve configured to engage the guide track of the mating electrical connector to slide within the guide track as the slider is moved in the sliding direction.

13. A connector system comprising:

a plug connector including a plug housing holding plug contacts, the plug housing having a plug end, the plug housing including a guide track at the plug end; and a header connector including a header housing holding header contacts, the header housing having walls forming a cavity that receives the plug end of the plug housing, the walls including a base wall, a first side wall, a second side wall, a first end wall, and a second end wall, the base wall provided at a rear of the housing, the base wall including contact channels, the first side wall including a slider slot open to the cavity, the header contacts held in the contact channels, the header contacts having mating ends mated with the plug contacts when the plug connector is plugged into the cavity, the header connector including a slider coupled to the first side wall of the housing and actuated from a first side of the housing, the slide received in the slider slot and movable in a sliding direction within the slider slot, the slider including a slider post extending into the cavity and movable within the cavity as the slider moves in the sliding direction, the slider post being received in the guide track of the plug housing to locate the plug end of the plug housing within the cavity of the header housing.

14. The connector system of claim 13, wherein the plug housing has a plug housing footprint and the header housing has a header housing footprint, the plug housing footprint being contained within the header housing footprint.

15. The connector system of claim 13, wherein the guide track includes a ramp angled transverse to a front of the plug housing, the slider post sliding along the ramp to transfer linear slider movement of the slider in the sliding direction into linear mating movement of the plug connector into the cavity of the header housing in a mating direction that is generally perpendicular to the sliding direction.

16. The connector system of claim 13, wherein the guide track is a first guide track, the plug housing including a second guide track at the plug end, the slider including a second slider post received in the second guide track.

17. The connector system of claim 13, wherein the guide track is provided at a first side wall of the plug housing, the plug housing including a second guide track at a second side wall of the plug housing, the second side wall of the header housing including a second slider slot, the header connector further comprising a second slider received in the second slider slot, the second slider including a second slider post extending into the cavity and being received in the second guide track of the plug housing.

18. The connector system of claim 13, further comprising a cable cover coupled to a cable end of the plug housing, the cable cover guiding cables extending from the plug contacts to a cable exit of the cable cover.

19. The connector system of claim 13, further comprising a cable cover coupled to a cable end of the plug housing, the cable cover including at least three cable exits facing in corresponding different directions.

20. A connector system comprising:

a plug connector including a plug housing holding plug contacts, the plug connector including cables terminated to the plug contacts, the plug housing having a plug end and a cable end opposite the plug end, the plug housing including a guide track at the plug end, the plug connector including a cable cover coupled to the cable end, the cable cover including a first cable exit and a second cable exit extending in different directions; and a header connector including a header housing holding header contacts, the header housing having walls forming a cavity that receives the plug end of the plug housing, the walls including a base wall, a first side wall, a second side wall, a first end wall, and a second end wall, the base wall provided at a rear of the housing, the base wall including contact channels, the first side wall including a slider slot open to the cavity, the header contacts held in the contact channels, the header contacts having mating ends mated with the plug contacts when the plug connector is plugged into the cavity, the header connector including a slider coupled to the first side wall of the housing and actuated from a first side of the housing, the slide received in the slider slot and movable in a sliding direction within the slider slot, the slider including a slider post extending into the cavity and movable within the cavity as the slider moves in the sliding direction, the slider post being received in the guide track of the plug housing to locate the plug end of the plug housing within the cavity of the header housing.

* * * * *